(12) United States Patent
Reuss et al.

(10) Patent No.: US 12,554,111 B2
(45) Date of Patent: Feb. 17, 2026

(54) METHOD AND APPARATUS FOR CORRECTING ABERRATIONS IN FLUORESCENCE MICROSCOPY

(71) Applicant: Abberior Instruments GmbH, Goettingen (DE)

(72) Inventors: Matthias Reuss, Goettingen (DE); Jörn Heine, Witzenhausen (DE); Christian Wurm, Goettingen (DE)

(73) Assignee: Abberior Instruments GmbH, Göttingen (DE)

(*) Notice: Subject to any disclaimer, the term of this patent is extended or adjusted under 35 U.S.C. 154(b) by 940 days.

(21) Appl. No.: 17/717,499

(22) Filed: Apr. 11, 2022

(65) Prior Publication Data

US 2022/0244515 A1 Aug. 4, 2022

Related U.S. Application Data

(63) Continuation of application No. PCT/EP2020/078627, filed on Oct. 12, 2020.

(30) Foreign Application Priority Data

Oct. 11, 2019 (DE) ...................... 10 2019 007 066.6

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0032* (2013.01); *G02B 21/0072* (2013.01); *G02B 21/008* (2013.01)

(58) Field of Classification Search
CPC ............ G02B 21/0076; G02B 21/0032; G02B 21/0072; G02B 21/008; G01N 21/6458
(Continued)

(56) References Cited

U.S. PATENT DOCUMENTS 6,473,228 B1 10/2002 Toshimitsu
2005/0024718 A1* 2/2005 Sase .................... G02B 21/361
359/383
(Continued)

FOREIGN PATENT DOCUMENTS

DE 102017101188 A1 7/2018
DE 102017106143 A1 9/2018
(Continued)

OTHER PUBLICATIONS

Booth, M. J. et al., "Refractive-Index-Mismatch Induced Aberrations in Single-Photon and Two-Photon Microscopy and the Use of Aberration Correction", J. Biomed. Opt. 6 (3), 266 (2001).
(Continued)

*Primary Examiner* — Sharrief I Broome
(74) *Attorney, Agent, or Firm* — Thomas | Horstemeyer, LLP

(57) ABSTRACT

Scanning fluorescence microscopes and related methods are described for microscopically recording images of samples extending in three dimensions. In particular embodiments, the microscopes are configured for recording a first sectional image that is parallel to an optical axis of a microscope objective lens by scanning a sample with a focused excitation light distribution in a sectional area parallel to the optical axis of the microscope objective. The excitation light distribution may be corrected by a correction device according to initial adjustment values for adjustment parameters of an aberration correction function. The first sectional image is then evaluated and new adjustment values for the adjustment parameters are defined. Further image data are then recorded by scanning the sample with the focused excitation light distributions, with the excitation light distribution corrected by the correction device according to the new
(Continued)

adjustment values for the adjustment parameters of the aberration correction function.

25 Claims, 8 Drawing Sheets

(58) Field of Classification Search
USPC .......................................................... 359/385
See application file for complete search history.

(56) References Cited

U.S. PATENT DOCUMENTS

| | | | |
|---|---|---|---|
| 2005/0083517 A1* | 4/2005 | Asad | G02B 21/365 356/124 |
| 2006/0017001 A1* | 1/2006 | Donders | G02B 21/0064 250/390.07 |
| 2011/0102572 A1* | 5/2011 | Kihara | G02B 21/365 348/79 |
| 2011/0141260 A1* | 6/2011 | Ouchi | G06T 5/50 348/79 |
| 2013/0181143 A1* | 7/2013 | Betzig | G02B 21/0032 250/459.1 |
| 2014/0233094 A1* | 8/2014 | Ue | G02B 21/0072 359/368 |
| 2015/0226950 A1 | 8/2015 | Booth et al. | |
| 2015/0253562 A1* | 9/2015 | Kues | G02B 21/367 348/79 |
| 2016/0170193 A1 | 6/2016 | Ue | |
| 2019/0384051 A1 | 12/2019 | Gaiduk et al. | |
| 2020/0150423 A1* | 5/2020 | Matsumoto | G02B 21/367 |

FOREIGN PATENT DOCUMENTS

| | | |
|---|---|---|
| EP | 2770360 A2 | 8/2014 |
| EP | 3035104 A2 | 6/2016 |
| WO | 2005096062 A1 | 10/2005 |
| WO | 2014029978 A1 | 2/2014 |
| WO | 2018172271 A1 | 9/2018 |

OTHER PUBLICATIONS

Booth et al., "Aberration correction for confocal imaging in refractive-index-mismatched media", Journal of Microscopy, vol. 192, Pt 2, 90-98 (1998).
Patton, Brian R. et al., "Three-dimensional STED microscopy of aberrating tissue using dual adaptive optics", Optics Express, vol. 24, No. 8, 8862-8876 (2016).
Patton, Brian R. et al., "Is phase-mask alignment aberrating your STED microscope?", Methods Appl. Fluoresc. 3 (2015) 024002.
Dissertation Jörn Heine, "Intelligent-Illumination STED", Göttingen (2017).
Lenz, Martin O. et al., "3-D stimulated emission depletion microscopy with programmable aberration correction", J. Biophotonics 7, No. 1-2, 29-36 (2014).
Reinig Marc R et al: "Enhancing image quality in cleared tissue with adaptive optics", Journal of Biomedical Optics, SPIE, 1000 20th St. Bellingham WA 98225-6705 USA, Bd. 21 , No. 12, Dec. 1, 2016 (Dec. 1, 2016), p. 121508.
Booth M J et al: "Adaptive aberration correction in a confocal microscope", Proceedings of the National Academy of Sciences, National Academy of Sciences, US, Bd. 99, No. 9, Apr. 30, 2002 (Apr. 30, 2002), p. 5788-5792.
Philipp Katrin et al: "Axial scanning and spherical aberration correction in confocal microscopy employing an adaptive lens", Proceedings of SPIE; [Proceedings of SPIE ISSN 0277-786X vol. 10524], SPIE, US, Bd. 10679, Mai 24, 2018 (May 24, 2018), p. 106790E-106790E.
Travis J Gould et al: "Adaptive optics enables 3D STED microscopy in aberrating specimens References and links", Annu. Rev. Cell Dev. Biol Nat. Methods Opt. Lett. Science Biophys. J. Nat. Methods Biophys. J. Biophys. J. Science Opt. Express Nat. Methods Proc. Natl. Acad. Sei. U.S.A. Proc. Natl. Acad. Sei. U.S.A. Nat. Methods Proc. Natl Acad. Sei. U.S.A. Opt., Aug. 29, 2012 (Aug. 29, 2012), p. 285-314.
Poland S P et al: "Evaluation of fitness Parameters used in an iterative approach to aberration correction in optical sectioning microscopy", Applied Optics, Optical Society of America, Washington, DC, US, Bd. 47, Nr. 6, Feb. 20, 2008 (Feb. 20, 2008), p. 731-736.

* cited by examiner

METHOD AND APPARATUS FOR CORRECTING ABERRATIONS IN FLUORESCENCE MICROSCOPY

CROSS REFERENCE TO RELATED APPLICATIONS

This application is a continuation of International Application PCT/EP2020/078627 with an international filing date of Oct. 12, 2020 and claiming priority to co-pending German Patent Application No. DE 10 2019 007 066.6 entitled "Verfahren and Vorrichtung zur Aberrations—korrektur in der Fluoreszenzmikroskopie", filed on Oct. 11, 2019.

FIELD OF THE INVENTION

The present invention generally relates to the microscopy of samples extending in three dimensions, more particularly to the confocal laser fluorescence microscopy, the STED-microscopy and the MINFLUX-microscopy.

BACKGROUND OF THE INVENTION

A microscope comprising a correction device for correcting aberrations and a method of correcting aberrations are known from U.S. Pat. No. 6,473,228. In order to find adjustments for the correction device that correct the aberrations, a series of images of a sample is recorded at one axial position. The images of the series are recorded with different adjustments of the correction device. It is automatically determined at which adjustment the image contrast is the highest. The "hill climbing contrast detecting method" in which the adjustment of the correction device is altered in a same direction as long as the contrast increases from image to image, and in which the alteration of the adjustment is terminated as soon as the contrast has decreased from the second to last image to the last image is proposed for this purpose. Associated adjustments are assumed to be those with the best correction of the aberrations. One such series of images is then recorded for each of a plurality of axial positions, and associated adjustment values of the correction device are determined for each of the plurality of axial positions. In case that this method is executed with a sample extending in three dimensions, one also directly obtains one image for each axial position, which has been recorded with a good correction of the aberrations. Instead of the sample, a test object with identical optical properties as the sample could be used to determine adjustment values depending on the axial image position. The adjustment values obtained with the test object are stored. For a subsequent investigation of a sample these adjustment values are called-up and used for adjusting the correction device for the respective axial image position. In this case, it may be sufficient to record a single image of the sample for each axial position. In determining the adjustment values, the temperature of the test object can be stored. In investigating the sample, the adjustment of the correction device can be adapted to a difference in temperature between the test object and actual sample in a calculational way such that temperature-corrected adjustment values are used in the investigation. In determining the adjustment values or correction parameters for different axial positions, the axial positions may be automatically approached.

European patent application publication EP 2 770 360 A2 generally describes a method of determining an adjustment value for a correction device for correcting aberrations at an axial position. A microscope is described and claimed, which comprises the correction device and a control device and which is configured to execute the method of determining the adjustment value for a plurality of axial positions and to determine a function from the adjustment values determined for this plurality of positions by means of interpolation. The function describes the relation between the axial positions and the adjustment values. The microscope further comprises a drive device for the correction device which, for each axial position, is adjusted to an optimum correction adjustment value determined by the control device. Each adjustment value is determined based on the observation of a plane in the sample that is orthogonal to the optical axis.

Methods of determining adjustment values for a device for correcting aberrations and a control device which is configured for automatically applying this method are disclosed in European patent application publication EP 3 035 104 A2. The disclosure particularly relates to an iterative method of determining an adjustment value at one axial position, i.e., to the determination of an adjustment value for an image plane which is orthogonal to the optical axis. In the publication, it is indicated that an aberration correction adjustment value often linearly increases with the depth of the observation plane and that this linear increase changes if areas of different refractive indices follow to one another so that the relation of the correction value and the axial position or observation depth can be expressed by a piecewise linear relation. Further, it is described that at first a three-dimensional image of a sample is recorded without adjusting the correction device. This image is displayed and shown to a user who selects an area from the image, particularly an area between two axial positions, which he wants to view. In this area, the method of determining the adjustment value is then executed for several observation depths. Further, it is proposed to graphically display a relation between the adjustment values determined for the different observation depths and the observation depths as a functional relation. Based on this display, the user may then define different areas such that a linear relation between the adjustment value and the observation depth may be assumed in each of them. Alternatively, the relation may be defined as a non-linear functional relation for each or some of the areas. For determining the adjustment values, partial areas may also be defined in the directions orthogonal to the optical axis. The method of determining the adjustment values may be applied within each of these partial areas. In observing the sample, the correction device is adjusted according to the previously determined adjustment values depending on the observation depth and, where applicable, also depending on the lateral position.

Booth, M. J. et al., "Refractive-Index-Mismatch Induced Aberrations in Single-Photon and Two-Photon Microscopy and the Use of Aberration Correction", J. Biomed. Opt. 6 (3), 266 (2001) and Booth et al., "Aberration correction for confocal imaging in refractive-index-mismatched media", Journal of Microscopy, Vol. 192, Pt 2, 90-98 (1998) present deductions according to which aberrations, that are only induced by a mismatch of the refractive index of a medium in which a sample is embedded, can be described by a sum of circular Zernike polynomials, the entire function linearly depending on the axial position in the medium. One of these Zernike polynomials is a function which describes a shift of the average phase of the wavefront. Such a shift has no influence on the image quality. The first relevant summand is the circular Zernike polynomial of index 2 which describes the defocusing; the second summand is the circular Zernike polynomial of index 4 which describes the spherical aberrations of first order; the third summand belongs to index 6 and describes the spherical aberration of second order and so on. In "Refractive-Index-Mismatch Induced Aberrations in Single-Photon and Two-Photon Microscopy and the Use of Aberration Correction", it is shown that these spherical aberrations, in observing a sample either with single photon fluorescence excitation by means of a confocal microscope or with two photon excitation, may result in an approximately linear decrease of the resolution with increasing observation depth. In "Aberration correction for confocal imaging in refractive-index-mismatched media", a loss of image brightness and a loss of resolution are designated as the essential effects of the aberrations. In both publications it is proposed to integrate an adaptive element, that modulates a wavefront such that the aberrations caused by the mismatch are compensated, into a microscope. According to the later publication, the loss of signal and resolution are thus avoided.

Patton, Brian R. et al., "Three-dimensional STED microscopy of aberrating tissue using dual adaptive optics", OPTICS EXPRESS, Vol. 24, No. 8, 8862-8876 (2016), disclose a STED microscope with an integrated adaptive optics for correcting aberrations. Based on an assessment of the image quality of images for x-y image planes, i.e., for planes orthogonal to the optical axis, the adaptive optics is adjusted for correcting aberrations. It is noted that besides spherical aberrations also coma and further higher non-circular aberrations arise. Results of modelling the influence of the coma are shown in a figure; and, according to the publication, the influence of the coma in the focus of the STED beam is most distinct in an y-z-section. In this context it is to be emphasized that the figure depicts modelling data only, and that the STED-focus as such is, as a rule, not accessible to observation by fluorescence detection.

Patton, Brian R. et al., "Is phase-mask alignment aberrating your STED microscope?", Methods Appl. Fluoresc. 3 (2015) 024002, describe that a poor alignment of a phase mask for wavefront shaping of the STED beam has effects similar to coma. Both modelling data and experimental data recorded with gold beads show that the reason for the disturbance, i.e., coma or misalignment, can be recognized based on x-z-scans within a STED-focus. It is stated that a differentiation on basis of STED fluorescence images is hardly possible so that coma and misalignment are easily mixed up.

International laid open publication WO 2014 029978 A1 discloses a microscope comprising a correction device for correcting aberrations. A method of correcting aberrations is claimed which essentially relates to a special measure for measuring the image quality. According to the publication it has been shown that neither the image contrast alone nor the image brightness alone are well suited as a criterion for identifying images which are ideally corrected for aberrations. Thus, a criterion is determined that considers both brightness and contrast. The adjustment of the correction device for correcting aberrations is found based on images for image planes orthogonal to the optical axis.

The dissertation Jörn Heine, "Intelligent-Illumination STED", Gottingen (2017) (downloadable under http://hdl.handle.net/11858/00-1735-0000-002E-E3B0-E), discloses a STED microscope in which a spatial light modulator (SLM) based on liquid crystal technology and integrated in a special arrangement is used as a wavefront modulator for imprinting the wavefronts modulations necessary for forming a STED-focus. The special arrangement is used to shape the STED-focus in three dimensions. At the same time, the SLM is used to compensate for aberrations. X-z-sections of volume images are shown which are based on data that have been recorded either confocally without STED beam or without aberration correction or with aberration correction.

Lenz, Martin O. et al., "3-D stimulated emission depletion microscopy with programmable aberration correction", J. Biophotonics 7, No. 1-2, 29-36 (2014), disclose a further STED-microscope which, with regard to its function, essentially corresponds to that one disclosed by Jörn Heine (2017). Also here, x-z-sections of aberration corrected STED-data are shown. How the adjustment values for the aberration correction are obtained is described only vaguely. However, from the indication that the adjustment values are obtained "in real time" it may be derived that images for planes orthogonal to the optical axis will be evaluated, as otherwise a correction in real time would not be possible because the scanning in z-direction is rather slow.

German patent application publication DE 10 2017 101 188 A1 discloses a method of microscoping a sample with a microscope and a corresponding microscope that includes an objective lens and an image sensor for transforming an image imaged onto the image sensor by means of the objective lens. A field of view of the microscope is varied by selecting a section of the image sensor. In order to record an initial image of at least a partial area of the sample by means of the microscope, a first field of view of the microscope is selected. The initial image is analyzed to determine at least two partial field of views imaging different partial areas of the initial image. For each of the determined partial field of views, microscopic images of the respective partial area of the sample are recorded. Additionally, the initial image and several of the microscopic images are recorded together with a depth information such that these are three dimensional images. For recording the initial image or the microscopic images with an increased depth of sharpness and the additional depth information, an actuator at an active optical element of the microscope is controlled. The actuator is a focus actuator and/or an aberration actuator. In one embodiment, the active optical element is made as a micro system comprising mechanically movable micro mirrors for recording an enlarged depth of sharpness. By means of varying the position of the micro mirrors, this micro system allows for a very quick adjustment of the focal plane to be imaged. Thus, it is possible to record a plurality of images for neighboring focal planes within short time. Such a sequence of images which are recorded for different focal planes is also designated as a focus stack. From a focus stack, an image of enlarged depth of sharpness can be determined. The microscopic images of the partial areas are also designated as tiles. The known method is thus suitable for microscoping large samples, like for example a printed circuit board. The microscopic images of the partial areas recorded are combined into a full image of the sample. For each of the partial areas, a partial area imaging field of view is determined and used for recording the corresponding image. Besides the field of view, further parameters of the microscope are adapted for recording the microscopic images of the partial areas of the sample. These parameters are determined as a result of the analysis of the initial image and selected in the microscope for recording the microscopic images of the partial areas. The further parameters of the microscope include parameters for aberration control and/or parameters for controlling the actuator of the active optical element.

There still is a need of a method of microscopically recording images of samples extending in three dimensions with an enhanced correction of aberrations occurring in samples extending in three dimensions, and of an apparatus comprising a user interface configured for implementing such a method.

SUMMARY OF THE INVENTION

The present invention relates to a method of microscopically recording images of samples of three-dimensional extension. The method comprises a first step of recording at least one first sectional image by scanning a first sample with a excitation light distribution, which is focused by means of a microscope objective lens, in a sectional area that is parallel to an optical axis of the microscope objective lens such that the at least one first sectional image is recorded along the optical axis of the microscope objective lens, wherein the excitation light distribution is corrected by means of an adjustable correction device according to initial adjustment values for adjustment parameters of an aberration correction function and wherein fluorescence light emitted out of the first sample is detected for each scanning position. The method further comprises a second step of evaluating the at least one first sectional image, a third step of defining new adjustment values for the adjustment parameters of the aberration correction function, and a fourth step of recording further image data by scanning the first sample or another sample with the focused excitation light distribution, wherein the excitation light distribution is corrected by means of the adjustable correction device according to the new adjustment values for the adjustment parameters of the aberration correction function, and wherein fluorescence light emitted out of the respective first or other sample is detected for each scanning position. The first, second, third and fourth steps are executed in the above order. The aberration correction function is a function of a z-position of the scanning position in a z-direction along the optical axis of the microscope objective lens.

The present invention also relates to a scanning fluorescence microscope. The scanning fluorescence microscope comprises an excitation light source configured for providing excitation light having an excitation light distribution, a microscope objective lens having an optical axis and configured and arranged for focusing the excitation light distribution of the excitation light, a mounting device configured for mounting a sample, a scanning device configured and arranged for scanning the sample mounted on the mounting device with the focused excitation light distribution in three spatial dimensions, a detection device configured and arranged for detecting fluorescence light emitted out of the sample for each scanning position of the scanning device, a storage device configured for storing sets of image data, an adjustable correction device configured for correcting aberrations of the excitation light distribution, a controller configured and connected for adjusting the correction device, and an evaluation unit configured and connected for evaluating the sets of image data and for defining adjustment values for adjustment parameters of an aberration correction function according to which the adjustable correction device is adjusted by the controller. The aberration correction function is a function of a z-position of the scanning position in a z-direction along the optical axis of the microscope objective lens. The scanning device is configured for scanning a first sample with the focused excitation light distribution in a sectional area that is parallel to the optical axis of the microscope objective lens such that at least one first sectional image is recorded along the optical axis of the microscope objective lens, wherein the excitation light distribution is corrected by means of the adjustable correction device according to initial adjustment values for the adjustment parameters of the aberration correction function and wherein fluorescence light emitted out of the first sample is detected for each scanning position by means of the detection device. The evaluation unit is configured for evaluating the at least one first sectional image and for defining new adjustment values for the adjustment parameters of the aberration correction function; and the scanning device is further configured for scanning the first sample or another sample with the focused excitation light distribution for recording further image data, wherein the excitation light distribution is corrected by means of the adjustable correction device according to the new adjustment values for the adjustment parameters of the aberration correction function, and wherein fluorescence light emitted out of the respective first or other sample is detected for each scanning position by means of the detection device.

The present invention also relates to a further scanning fluorescence microscope. The further scanning fluorescence microscope comprises an excitation light source configured for providing excitation light having an excitation light distribution, a microscope objective lens having an optical axis and configured and arranged for focusing the excitation light distribution of the excitation light, a mounting device configured for mounting a sample, a scanning device configured and arranged for scanning the sample mounted on the mounting device with the focused excitation light distribution in three spatial dimensions, a detection device configured and arranged for detecting fluorescence light emitted out of the sample for each scanning position of the scanning device, a storage device configured for storing sets of image data, an adjustable correction device configured for correcting aberrations of the excitation light distribution, a controller configured and connected for adjusting the correction device, an input unit configured for receiving user input for defining new adjustment values for adjustment parameters of an aberration correction function according to which the adjustable correction device is adjusted by the controller, the aberration correction function being a function of a z-position of the scanning position in a z-direction along the optical axis of the microscope objective lens, and a display unit for displaying the sets of image data. The scanning device is configured for scanning a first sample with the focused excitation light distribution in a sectional area that is parallel to the optical axis of the microscope objective lens such that at least one first sectional image is recorded along the optical axis of the microscope objective lens, wherein the excitation light distribution is corrected by means of the adjustable correction device according to initial adjustment values for the adjustment parameters of the aberration correction function and wherein fluorescence light emitted out of the first sample is detected for each scanning position by means of the detection device. The display unit is configured for displaying the at least one first sectional image recorded along the optical axis of the microscope objective lens; and the scanning device is further configured for scanning the first sample or another sample with the focused excitation light distribution for recording further image data, wherein the excitation light distribution is corrected by means of the adjustable correction device according to the new adjustment values for the adjustment parameters of the aberration correction function, and wherein fluorescence light emitted out of the respective first or other sample is detected for each scanning position by means of the detection device.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
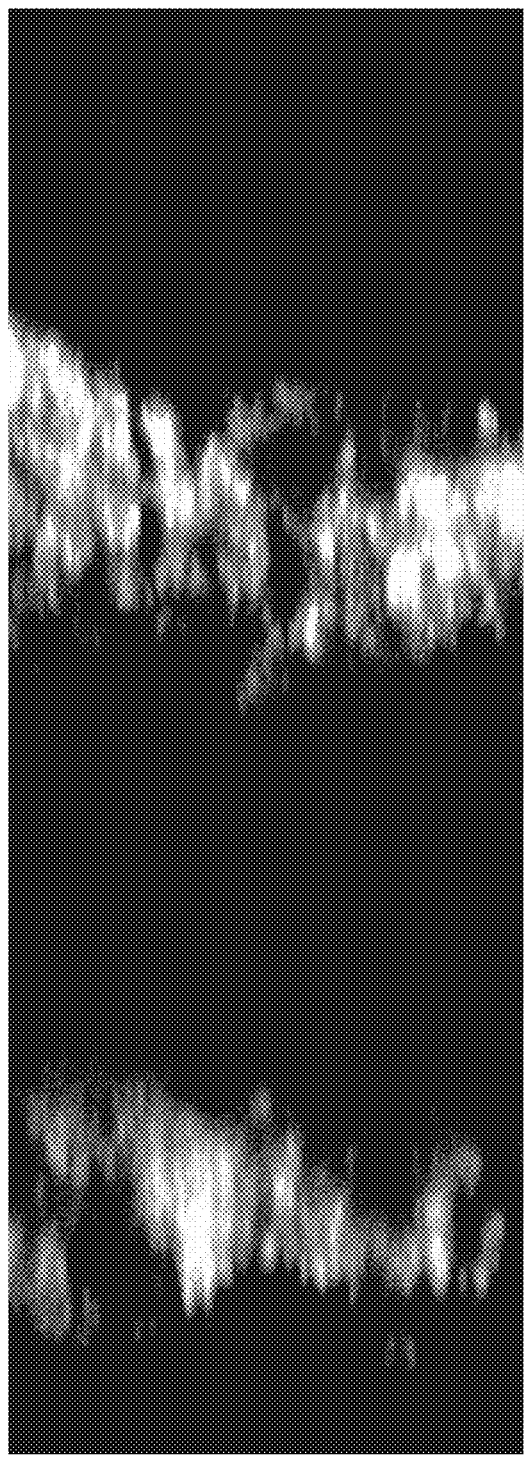
FIG. 1 is a sectional image of a sample, which has, without aberration correction, been recorded for a sectional plane parallel to the optical axis of a fluorescence microscope.

The method of microscopically recording images of samples extending in three dimensions comprises the following steps: a first step of recording a sectional image parallel to the optical axis of the microscope objective lens by scanning a first sample with a focused excitation light distribution in a sectional area parallel to an optical axis of the microscope objective lens, wherein the excitation light distribution is corrected by means of an adjustable correction device according to initial adjustment values for adjustment parameters of an aberration correction function, and wherein, for each scanning position, fluorescence light emitted out of the sample is detected. As an alternative, a plurality of such sectional images parallel to the optical axis of the microscope objective lens is recorded. In a second step, the first sectional image, or alternatively the plurality of such first sectional images, is evaluated. In a third step, new adjustment values for the adjustment parameters of the aberration correction function are defined. In a fourth step, further image data are recorded by scanning a sample which may be the first or another sample with the focused excitation light distribution, wherein the excitation light distribution is corrected by means of the adjustable correction device according to the new adjustment values for the adjustment parameters of the aberration correction function, and wherein, for each scanning position, fluorescence light emitted out of the sample is detected. Said first, second, third and fourth steps are executed in the order of their naming. The aberration correction function is a function of a z-position of the scanning position in a z-direction along the optical axis of the microscope objective lens.

Generally, the aberration correction function is defined for such a range of z-positions that it extends over the full thickness of the samples to be investigated in the z-direction. Typically, this range of z-positions extends over at least 1 micron or several microns and it may extend up to more than 100 microns or even more than 1 millimeter. As it will be explained later, the aberration correction function may additionally be a function of the scanning position in lateral or x-y directions which are orthogonal to the optical axis of the microscope objective lens.

The indication that the first sectional image and the associated sectional area are parallel to the optical axis of the microscope objective lens includes the possibility that the optical axis of the microscope objective lens runs within the first sectional image and the associated sectional area. Alternatively, the optical axis of the objective lens runs at a distance to the first sectional image and the associated sectional area.

The indication that the excitation light distribution is corrected according to initial adjustment values for adjustment parameters of an aberration correction function in the first step includes the possibility that the initial adjustment values for the adjustment parameters of the aberration correction function do not yet result in any aberration correction in the first step.

Typically, the aberration correction function is a function of a z-position in the sample and varies along the optical axis of the microscope objective lens. This means that the excitation light distribution is not corrected for all z-positions within the sample in a same way by means of the adjustable correction device, at least if the new adjustment values for the adjustment parameters of the aberration correction function are utilized.

The adjustment parameters of the aberration correction function may particularly be amplification factors and offsets of individual components of the aberration correction function.

The indication that said first, second, third and fourth steps are executed in the order of their naming does not exclude that further steps are executed between the said four steps, which may be repetitions of any of the four steps that have already been executed.

If a "plurality of such sectional images" is recorded, the individual sectional images of this plurality may be recorded with adjustment values for the adjustment parameters of the aberration correction function which are identical or different to one another.

If the evaluation of the first sectional image or the plurality of the first sectional images in the second step has the result that the aberrations are already sufficiently corrected, the new adjustment values for the parameters defined in the third step and the initial adjustment values for the adjustment parameters may be identical. As a rule, the evaluation will have the result that the aberrations are not yet sufficiently corrected. In this case, the adjustment values for the adjustment parameters are altered in the third step.

If a plurality of sectional images with initial adjustment values for the adjustment parameters of the aberration correction function which differ from one another have been recorded, the evaluation of the plurality of the sectional images may have the result, that the initial adjustment values for the adjustment parameters belonging to one image of the plurality result in a sufficient aberration correction. In this case, the initial adjustment values for the adjustment parameters belonging to that image may be defined as the new and at the same time as the final adjustment values for the adjustment parameters.

As usual, in this description, a sectional image or image is not only understood as a visually perceivable graphic representation of a set of image data but also as the set of image data on which such a graphic representation may be based.

The method according to the present disclosure is characterized in that the sectional area in which the sample is scanned with the focused excitation light distribution in the first step is parallel to the optical axis of the microscope objective lens such that the first sectional image is recorded along the optical axis of the microscope objective. Such a sectional image extending in the longitudinal direction of the optical axis of the microscope objective does not only clearly reveal whether but also, if necessary, how the initial adjustment values for the adjustment parameters of the aberration correction function are to be corrected, i.e., how the new adjustment values for the adjustment parameters of the aberration correction function are to be defined in the third step. The reason for this is that the sectional image extending in the longitudinal direction of the optical axis of the microscope objective lens shows the course of the effects of the aberrations, which remain despite the aberration correction, in the depth direction of the sample. From this, the kind and the size of the remaining aberrations may be easily, i.e., also intuitively, be correctly recognized or quite exactly estimated. Thus, necessary changes in defining the new adjustment values for the adjustment parameters are easily estimated. The sectional image extending in the longitudinal direction of the optical axis of the microscope objective lens, both with respect to its intuitive interpretation and its information density, goes far beyond known bases for the optimization of an aberration correction function, like for example a three-dimensional image of the sample or a stack of sectional images extending normal to the optical axis of the microscope objective, which can hardly be displayed and visually perceived.

The first sectional image or the plurality of first sectional images may be evaluated either automatically by means of mathematical image analysis methods and using associated criteria for determining the aberrations which have had an influence on the first sectional image or the plurality of first sectional images, or by means of visual inspection by a human observer. In the latter case, the first sectional image or the plurality of first sectional images or one sectional image obtained from the plurality of first sectional images is displayed graphically, like for example on a monitor or screen as a grayscale image or as a colored image utilizing a color table or as a corresponding series of the images of the plurality of first sectional images, and the human observer estimates the aberrations based on the image or the series of the images, for example based on the image sharpness and/or the image brightness varying in the image field or the image fields. Similar or identical criteria like they are known from the prior art may be the basis for the automatic evaluation of the sectional image or the plurality of sectional images. Likewise, a controller suitable for this purpose may be trained by machine learning for automatically evaluating the sectional image or the plurality of the sectional images.

If the sectional image or the plurality of sectional images is evaluated automatically, the new adjustment values for the adjustment parameters may also be defined automatically.

In both cases, i.e., both with automatic evaluation and with visual inspection, it is possible, in case of evaluation by means of visual inspection by a human observer, for example, due to her or his experience, that, on basis of the evaluation final adjustment values for the adjustment parameters of the aberration correction function can and will already be defined in the third step. This is particularly easy if, in the first step, a plurality of images has been recorded with different initial adjustment values for the adjustment parameters.

If final adjustment values for the adjustment parameters are defined in the third step, the recording of further image data in the fourth step will already provide image data in which the observer is interested as a result of her or his microscopic investigation.

If final adjustment values for the adjustment parameters of the aberration correction function cannot yet be defined in the third step or if there is any doubt that the correction device, in applying the defined new adjustment values for the adjustment parameters, will provide a sufficient correction of the aberration, the recording of further image data in the fourth step can be a recording of a further sectional image by scanning the first sample with the focused excitation light distribution in a sectional area parallel to the optical axis of the microscope objective lens, or of a plurality of such further sectional images. In this case, a single further sectional image or a plurality of further sectional images may be recorded in the fourth step, independently on whether a first sectional image or a plurality of first sectional images has been recorded in the first step.

The further sectional image obtained in this fourth step is then evaluated in a further step, wherein, independently on the kind of the evaluation in the second step, the evaluation in the further step may either take place automatically by means of mathematical image analysis methods or by means of visual inspection by a human observer. Often, the evaluation in the further step will take place according to the evaluation in the second step, i.e., a further automatic evaluation follows to an automatic evaluation, and a further visual inspection follows to a visual inspection. However, this will not always apply, as it will be explained further down.

Once again, like after the evaluation in the second step, it is now possible that on basis of the evaluation in this further step, in a step following to the further step, final adjustment values for the adjustment parameters of the aberration correction function can and will directly be defined, or that final adjustment values for the adjustment parameters of the aberration correction function cannot yet be defined in this following step or that there is doubt that the correction device in applying the new adjustment values for the adjustment parameters defined in this following step will provide a sufficient correction of the aberration. If final adjustment values for the adjustment parameters are defined, the image data in which the observer is interested as the result of her or his microscopic investigation may, directly afterwards or later, be recorded using the defined adjustment values for the adjustment parameters. If adjustment values for the adjustment parameters are defined after the further evaluation, which are not considered to be final, once again a further sectional image is recorded by scanning the first sample with the focused excitation light distribution in a sectional area parallel to the optical axis of the microscope objective, or a plurality of such further sectional images is recorded, and evaluated afterwards, and, on basis of the evaluation, new adjustment values for the adjustment parameters are defined once again.

Such an iterative execution of the method according to the present disclosure may also be described in that either the first step and the second step or the first step and the second step and the third step are at least repeated once after the third step, before the fourth step is executed in which the image data are recorded in which the observer is interested as the result of her or his microscopic investigation.

The iteration is terminated at the time when either on basis of the evaluation following to a recording of a sectional image or a corresponding recording of a plurality of sectional images final adjustment values for the adjustment parameters can and will be defined, because these final adjustment values for the adjustment parameters, for example, differ from the previously defined adjustment values for the adjustment parameters by less than a lower limit for rewarding further changes, or because the evaluation of the sectional image or the corresponding plurality of sectional images has the result that the aberrations are sufficiently corrected. In this case, the adjustment values for the adjustment parameters defined at last are defined as final adjustment values for the adjustment parameters in one of the next steps following to the evaluation.

Such an iterative definition of the adjustment values for the adjustment parameters is possible without high difficulties, if the number of the adjustment parameters is small and if a simple correlation exists between the adjustment parameters and the aberrations effective in recording images. In this case, it is possible to define new adjustment values for the adjustment parameters after evaluation, like for example after visual inspection of a sectional image, by way of trial in the third step of defining, and, after recording a further sectional image with the new adjustment values for the adjustment parameters, to compare the quality of the sectional image recorded at last with the sectional image recorded before. From this comparison, it can be recognized whether the change has resulted in an improvement or in a deterioration. From such a comparison, it then results whether a further change of the adjustment values for the adjustment parameters should take place in the same direction as the first change or in an opposite direction. Such a simple correlation is, for example, given if the correction device is configured to correct such aberrations which are caused by a mismatch of the refractive index of an embedding medium of a sample to the refractive index of an immersion medium used. According to the disclosure of the two publications by Booth, M. J. and the respective co-authors, "Refractive-Index-Mismatch Induced Aberrations in Single-Photon and Two-Photon Microscopy and the Use of Aberration Correction" and "Aberration correction for confocal imaging in refractive-index-mismatched media", which have already been mentioned in the prior art section, such aberrations may be described by a sum of circular Zernike polynomials of even index. The magnitude of the aberrations linearly depends on the axial or z-position in the mismatched medium. In this case, the aberration correction function is a linear function of the z-position in the sample. Then, an aberration correction offset and an aberration correction slope are the adjustment parameters.

Further above, it has been explained that often an automatic evaluation will follow to an automatic evaluation and a visual inspection will follow to a visual inspection. Particularly in the last evaluation step which results in the final definition of the adjustment values for the adjustment parameters, this does not need to apply. It may, for example be suitable that at first a series of automatic evaluations and definitions of new adjustment values for the adjustment parameters are executed until, like for example after reaching a fixed number of evaluations or after achieving a certain image quality of a sectional image measured by means of predetermined criteria or at the time when, from one to the next iteration step, there is no improvement in the image quality from one sectional image to the following sectional image, the series of automatic evaluations and definitions is terminated and the observer executes a visual inspection afterwards. The observer has then to define the last adjustment values as final adjustment values for the adjustment parameters or to define other new adjustment values for the adjustment parameters by himself, either as final adjustment values for the adjustment parameters or as a base for a further iteration. It may also be considered that the observer terminates the process, if, for example, the image quality is not sufficient, and, for example, investigates whether any error, like, for example, a bubble in the immersion medium or a damage to the cover slip or something similar, is present. Vice versa, it may also be considered that at first a series of visual inspections and definitions is carried out by the observer and that afterwards, in a following step, the image quality of the sectional image is automatically determined by means of preset criteria such that an objective measurement is provided to the observer by means of which she or he checks her or his subjective impression objectively before any adjustment values for the adjustment parameters are defined as final adjustment values for the adjustment parameters of the aberration correction function.

This definition of adjustment values as final adjustment values for the adjustment parameters may also be made implicitly or automatically, i.e. without the user expressively carrying out any action for defining any adjustment values as final adjustment values for the adjustment parameters, for example, in that when starting a microscopic observation, whenever this start is carried out, the previously selected adjustment values for the adjustment parameters are assumed as final adjustment values for the adjustment parameters.

After defining the final adjustment values for the adjustment parameters, the image data may be recorded in which the observer is interested as a result of her or his microscopic investigation. Generally, the final adjustment values for the adjustment parameters of the aberration correction function may be defined based on image data that have been recorded for the same sample which is investigated directly afterwards or later. However, this is not necessary. If, for example, a series of similar samples, like for example a series of samples which have been produced under controlled equal conditions, is investigated, it can be sufficient to define final adjustment values for the adjustment parameters based on image data recorded for a single one of the samples to be investigated and to utilize these final adjustment values for the adjustment parameters in obtaining images of all or at least several samples of the series. It may also be considered to keep and use special reference samples for the definition of the final adjustment values for the adjustment parameters. This may be a suitable solution, if only spherical aberrations which are caused by a mismatch of the refractive index of a medium in which a sample may be embedded to the refractive index of an immersion medium which may also be air are to be corrected by the adjustable correction device. The adjustment values for the adjustment parameters of the aberration correction function which have been defined as final based on a reference sample or a single sample of a series of samples may then be used in the microscopic investigation of each sample whose embedding medium has the same refractive index as the embedding medium of the reference sample or the single sample of the series of samples.

Generally, it is also possible, similarly as proposed in U.S. Pat. No. 6,473,228 B1, to also store the temperature of the reference object in obtaining the final adjustment values for the adjustment parameters of the aberration correction function and to modify the final adjustment values for the adjustment parameters of the aberration correction function according to the actual temperature of the sample in the later observation of the sample, i.e. in obtaining the image data in which the observer is interested as the result of her or his microscopic investigation. This is, for example, particularly advantageous if images are to be recorded under physiological conditions at 37° C. Likewise, the respective temperatures of the immersion medium and/or temperature differences between the sample or reference sample and the immersion medium can be considered in recording images of the sample or the reference sample. For such a correction, a model may be set up which sufficiently represents the temperature effects, for example, in form of the temperature-dependent Sellmeier-equation. Alternatively, a series of measurements for different temperatures or temperature pairs may be carried out at a reference sample or at a sample of a series of samples to be investigated which is used as a reference sample. Such a process appears to be complicated. However, the effort related to this process may be justified, particularly in the context of screenings of samples which are comparable to each other, or also in investigating the reaction of samples or of objects included in the sample, like for example sub-cellular structures, to temperature changes. Then, there is not only the advantage that the investigation of the number of samples to be screened requires less time, but also the advantage that the samples to be investigated are not yet subjected to excitation light, which may result in bleaching of the subjected sample areas, prior to the actual investigation.

In case that the final adjustment values for the adjustment parameters of the aberration correction function are not yet defined in the third step but in an iterative process, one or more further sectional images which are obtained by scanning a sample with the focused excitation light distribution in a sectional area parallel to the optical axis of the microscope objective lens, or one or more pluralities of such further sectional images are recorded besides the first sectional image that is parallel to the optical axis of the microscope objective lens and that is obtained by scanning the sample with the focused excitation light distribution in the sectional area parallel to the optical axis of the microscope objective lens, or the plurality of such first sectional images. In case that each time single sectional images, i.e., no pluralities of sectional images, are recorded, the sectional areas of the sample corresponding to the different sectional images which are obtained in the consecutive iteration steps may be identical, but this is not obligatory. In case that in one or several steps of the iterative process pluralities of sectional images are recorded, the sectional areas or pluralities of sectional areas of the sample corresponding to the pluralities of sectional images may completely or partially overlap, but this is not obligatory.

The same applies to the sectional areas corresponding to different sectional images of one plurality of sectional images, they may also be different, but this is not obligatory. They may, for example, belong to parallel planes or to neighboring areas of one plane.

If the sectional areas of the sample, which are used in consecutive steps of an iterative process for finding the adjustment values for the adjustment parameters, cover each other, this has the effect that particularly well-suited adjustment values for the adjustment parameters of the aberration correction function may be found for exactly this one sectional area. Further, the comparability of the sectional images with one another is particularly good. It is a drawback that the sample, in the respective one sectional area, is several times subjected to excitation light and may thus be bleached comparatively stronger. It is a further disadvantage that in case that the sample is inhomogeneous in lateral direction, for example when the refractive index of the sample varies in lateral direction, the aberration correction is of lower quality in areas neighboring the one sectional area.

In many but not in all cases, the sectional areas may be sectional planes, wherein sectional plane in this context should not be understood as the entire sectional plane of infinite extension to which the sectional area belongs but as the flat sectional area only.

If at least some of the sectional planes of the sample, which are used in consecutive steps of an iterative process for finding the adjustment values for the adjustment parameters, differ from one another, this has the effect that, in finding the adjustment values for the adjustment parameters, a laterally extended area of the sample is used. Although a larger area of the sample is bleached in this case, each individual sectional plane is bleached less than sectional planes which cover each other. It may be particularly advantageous to select a sectional plane as the last sectional plane prior to defining the final adjustment values for the adjustment parameters or prior to defining the adjustment values for the adjustment parameters in the preceding step of defining, which has already been selected in a previous step of the iteration. In this way, it may be recognized whether the adjustment values for the adjustment parameters obtained from the previously imaged sectional plane are also suitable for an aberration correction in the sectional plane selected at last. Something similar applies if non-flat sectional areas are utilized instead of sectional planes.

Recording a plurality of first sectional images for a plurality of different sectional planes of the sample in the first step and/or in corresponding following steps of an iterative process has the effect, that in each consecutive evaluating step information about sectional planes arranged at a lateral distance with respect to one another or about sectional planes oriented at an angle with respect to one another is obtained. It is, for example, possible and suitable to select a set of sectional planes in the first step, one of which being located in a first lateral boundary area of the sample or of that area of the sample which the observer wants to investigate microscopically, i.e., of the area of interest, and another of which being located laterally vis-à-vis. Whether and, if applicable, for how many sectional planes between these two sectional planes which are arranged in boundary areas, sectional images are recorded, may be depend on the lateral extension of the area of interest and the kind of the sample. In a step of evaluating, in which sectional images for several sectional planes which have been recorded with the same adjustments of the correction device are evaluated, it may be recognized by comparison of the sectional images by means of visual or automatic comparison, whether comparable or even equal aberrations are effective in the different sectional planes, or whether the aberrations differ between the individual lateral positions. Based on the evaluation of the sectional images, it is then possible to determine partial areas of the sample in lateral direction, for which the adjustment values for the adjustment parameters of the aberration correction function should be defined separately. Such a determination may already take place after the evaluation of the plurality of the first sectional images. It is however also possible to at first define adjustment values for the adjustment parameters on the base of all sectional images, which adjustment values are, in a following step, used in recording a plurality of further sectional images for corresponding sectional planes, and to determine partial areas of the sample in one of the following steps, when the sectional images which are recorded with partial correction of the aberrations show that different adjustment values for the adjustment parameters are necessary for each of different lateral areas of the sample in order to achieve a full or at least sufficient correction of the aberrations. In this context, corresponding sectional planes are to be understood as such planes which are identical to already used or close neighbors to already used sectional planes.

Further, based on the evaluation of a single sectional image, it is possible to determine whether occurring aberrations are constant or vary along the lateral direction of extension of the section. This also applies to each individual sectional image of a plurality of sectional images recorded for a plurality of sectional planes. This means that based on recording a plurality of sectional images for parallel planes it can be recognized whether partial areas of the sample are to be determined in any of the two lateral directions, for which the adjustment values for the adjustment parameters of the aberration correction function are to be defined separately. Once again, the partial areas of the sample may be determined in a later iteration step after a previous partial correction of the aberrations.

Further, it is possible to define sectional planes of different orientations. Particularly, it is possible to define sectional planes which intersect each other at right angles. If, for example, two sectional planes are defined which intersect in lateral directions in or close to the center of the area of interest and which each extend up to the boundary or beyond the boundary or into the proximity of the boundary of the area of interest, it may be recognized in a particularly easy way whether the sample is to be divided up in partial areas in lateral directions to achieve a sufficient correction of the aberrations.

The sample may be divided into partial areas based on a visual inspection by the user or observer or automatically. Further, it is possible to combine the individual variants of recording sectional images. For example, two sectional images may be recorded for two sectional planes which intersect at right angles in the first step, then one or more steps of evaluating and defining may be based on a single sectional image, and afterwards a plurality of parallel sectional images may be recorded, evaluated and used for defining new adjustment values for the adjustment parameters.

There may also be the need of axially the sample or respective lateral partial areas of the sample into sections. This, for example, applies if the refractive index of the embedding medium of the sample or an effective locally averaged refractive index of the sample varies in axial direction. This, for example, may apply if structures included in the sample cause local aberrations. The latter is often the case in fluorescence microscopy at biological samples. If, for example, a cell is located in the illumination and detection path, the area downstream of the cell along the illumination path is often subject to strong aberrations, whereas the area up to the cell and even into the cell and laterally besides the cell is subject to clearly smaller aberrations. Depending on the cell structure and the shape of the cell, the aberrations may be similar to a coma, an astigmatism or any other of the known classes of aberrations or of combinations thereof. Spherical aberrations may also be caused by such local structures. The aberrations caused by local structures have in common that they have local effects only. These effects are local in that sense that they decrease with increasing distance, even axially in illumination direction or opposite to the detection direction. Especially in the context of such local structures, a particular advantage of the method according to the present disclosure becomes evident.

If correction terms would, like in the prior art, be determined from sectional images orthogonal to the optical axis, a consideration of the local effects would not be possible at all or only at high effort. The reason is that areas above, in and below such local structures would not together be included in any of the individual images. However, in the method according to the present disclosure, this is the case as for each structure within the observed sectional plane a sectional image is obtained, wherein especially areas above, in and below the respective local structures belong to the sectional image. Thus, on basis of the sectional images, it can easily be decided whether a global correction with global adjustment values for the adjustment parameters for a larger image area is sufficient or whether, in a close range, a particular correction is necessary or at any rate suitable, which, if applicable, may be added to a global correction.

The sample may be divided into axial partial areas on basis of a visual inspection by the user or observer, or automatically. With regard to the consideration of local structures, a division of the sample on basis of a visual inspection is easier. At least if the adjustment values for the adjustment parameters are determined on basis of the same sample which the user wants to investigate, the user may easily decide based on the sectional images whether the locally occurring aberrations are relevant. If she or he is, for example, not interested in an area located below a cell but only interested in the interior of the cell and in areas which are, for example, axially so far away that the local aberration is not evident, she or he will do without determining partial areas of the sample. If such a situation is present at a location in the sample or if such a situation is present in a plurality of sectional images, there is high probability that it can be done without a tightly limited local correction in the entire sample or at least in an entire partial area of the sample. In case that the observer is, for example, interested in biological structures in the boundary area of cells or outside of a cell or close to such a cell, she or he will be interested in a correction just in these local areas. She or he may obtain such a correction in that, if applicable in addition to a global correction, a separate correction is executed for the local partial area for which separate values for the adjustment parameters of the aberration correction function are determined. In many cases it will, however, be sufficient that adjustment parameters are defined for a larger partial area in such a way that the image quality is particularly good right in those areas which are of particular interest to the user.

In some of the above passages, it has been taken as a basis that adjustment values for the adjustment parameters are determined based on sectional images of the sample to be investigated which also belong to sectional planes which the user wants to investigate microscopically. This way of determining the adjustment values for the adjustment parameters has many advantages, for example those which have been described above. However, it has the disadvantage that at least partial areas of the sample to be investigated microscopically are subjected to excitation light and thus bleached even prior to the microscopic investigation. In many cases this can be avoided, namely then when the sample is sufficiently homogeneous in lateral direction. This condition is often fulfilled, as in many cases the essential aberrations are caused by a mismatch of the refractive index of the sample to that one of the immersion medium. Such a mismatch does often not depend on the lateral position. A further source of aberrations which also do not depend on the lateral position is a not correctly selected or determined refractive index of the immersion medium as such, particularly also as a result of an ambient temperature differing from a desired value, or a mismatch of the cover slip thickness. If such aberrations are to be corrected, it is advantageous to place the sectional plane or the sectional planes based on which the adjustment values for the adjustment parameters are determined in a sample area or in sample areas which are laterally outside the area of interest. With regard to other aspects, the method may be carried out as explained further above. For example, it is advantageous to form a sectional plane or a set of sectional planes which are laterally outside the area of interest but are close neighbors to that area of interest. Further one or more sectional planes may be selected, which are each parallel or tangential with respect to boundaries or parallel to tangents to the boundaries in lateral direction.

It is also possible to select a non-flat sectional area instead of one or more sectional planes, i.e., such a non-flat sectional plane which, laterally outside of the area of interest, runs parallel to a boundary of the area of interest. Naturally, it is also possible to select several of such sectional planes. In evaluating the sectional images, it has then to be considered that depending on the curvature, if applicable on the locally varying curvature, of the sectional area structures imaged appear distorted, and that, for example, in a plane depiction of the image data image points are depicted in one plane which belong to object points which are in fact not located in one plane. Nevertheless, such a procedure may be suitable and advantageous, because differences in the aberrations in an area enclosing the area of interest can be seen in one image; if there are no differences, this may also be seen in one image.

As mentioned several times both in the prior art and in this description, a mismatch of refractive indices is an essential cause of aberrations. These aberrations can be represented by a sum of circular Zernike polynomials of even index, i.e., that they are composed of a defocusing and a sum of the spherical aberrations of all possible orders. In the following, the latter sum will as a whole be designated as spherical aberrations. Somewhat more general, this applies in that sense that, with a transition from a first medium into a second medium with another refractive index, a defocusing and spherical aberrations are introduced. The magnitudes both of the defocusing and of the spherical aberrations increase with the distance of the desired position of a focal point in the second medium to the boundary plane of the two media; i.e., if an objective lens is adjusted such that it produces a focus in a uniform medium at a first axial distance to the location at which the boundary area is located in the non-uniform medium, it produces an aberrated focus with the boundary area present. The aberrated focus is located at a distance to the boundary area, which multiplicatively results from the first axial distance and a constant. The magnitude of the spherical aberrations also results from the distance and, at least with suitable normalization or presentation of the respective Zernike polynomials, from the same constant. If a second boundary layer is added at a transition into a third medium, the same applies in the third medium as in the second medium, wherein the defocusing and the spherical aberrations introduced up to the second boundary layer persist. The total defocusing and the total spherical aberrations which occur in the third medium are thus additively composed of the aberrations introduced up to the second boundary layer and aberrations which multiplicatively result from a further constant and the distance to the second boundary layer. In the following, the constant mentioned here will be designated as aberration correction slope. Corresponding interrelations apply for following layers with different refractive indices.

As a result, an aberration correction function for correcting the defocusing and/or the spherical aberrations for an area with an, in axial direction, homogeneous refractive index, as proposed in the prior art, for example in EP 2 770 360 A2, may be obtained from aberration correction values for two axial positions within the homogeneous area. In the method according to the present disclosure, the above-mentioned aberration correction slope is finally determined from two aberration correction values for focus positions at an axial distance. One of the two aberration correction values may be considered as an aberration correction offset value.

In the general case that the refractive index of the sample does not change in axial direction in steps at boundary layers or in case that the individual layers of constant refractive index are very thin, the necessary aberration correction for the defocusing and/or the spherical aberrations result from an integral over the entire thickness up to the focus position considering the respective refractive index which is locally present in axial direction. If the refractive index, for example, linearly varies with the axial position, the magnitude of the necessary correction of the spherical aberration and the defocus changes according to a square function. For this latter case, a good correction of the defocusing and/or the spherical aberrations may be obtained based on an aberration correction function with three adjustment parameters. According to the prior art, such a three-parameter correction function may be obtained from aberration correction values for at least three planes oriented orthogonally to the optical axis.

According to the method according to the present disclosure, no single aberration correction slope and single aberration correction function are as a whole determined from correction values for two focal positions at an axial distance, and also no single three-parameter correction function is determined from correction values for at least three focal positions at axial distances. As described above, sectional images for sectional areas, in many cases for sectional planes, which are parallel to the optical axis are recorded. For a first step of recording, initial aberration correction offset values and an aberration correction slope may be estimated. The initial values may be defined on basis of information on the immersion medium, if applicable on the cover slip, and particularly on the embedding medium of the sample. The initial values may also be individually or all together be set to the value of 0 (zero). The aberration correction offset value has a direct effect on the correction of the aberrations in a fixed first plane of the sample orthogonal to the optical axis, which is independent on the value of the aberration correction slope. Indirectly or additively, it has an effect on the aberration correction in all further planes orthogonal to the optical axis. The first plane may, for example, be the plane of the boundary layer between the cover slip and the sample. Alternatively, it may be any freely selectable reference plane. However, this reference plane preferably intersects the optical axis within the axial area for which the aberration correction shall be carried out. The value of the aberration correction slope has an effect in all planes which are orthogonal to the optical axis except of the above-mentioned reference plane. This effect linearly increases with the distance to the reference plane. What has been said in this section applies to the correction of defocus and/or spherical aberrations but not, or at least not stringently, to a correction of other aberrations.

As already explained further above, this method may also be individually applied to several axial partial areas such that, as a result, a piecewise linear correction function is obtained. In many cases this will be necessary but also sufficient.

Alternatively, three initial adjustment values for the adjustment parameters of a three-parameter, for example of a square, aberration correction function for correcting defocus and/or spherical aberrations may be estimated for the first step of recording. Once again, one of the adjustment parameters may have the function of an aberration correction offset. The adjustment values for the two other adjustment parameters influence the variation of the aberration correction function with the depth, i.e., with the z-position in the sample; the third adjustment parameter may particularly have an influence on the curvature of the variation. The determination and application of such an aberration correction function may, for example, be suitable, if a temperature gradient is formed in the sample and remains during its observation. This is, for example, possible, if there is a difference in temperature between objective lens and sample holder. As a rule, the refractive index of a medium is steadily and monotonously correlated with the temperature such that a temperature gradient will result in a corresponding gradient of the refractive index. Thus, the course of the refractive index may at least be approximated by a linear function. Also here, the final adjustment values for the adjustment or correction parameters may be determined automatically or by means of visual inspection.

Generally, by means of the method according to the present disclosure, it is also possible to determine aberration correction functions for correcting defocus and/or spherical aberrations with four or more adjustment parameters. The more adjustment parameters are available, the more complicated becomes the definition of the right adjustment values for the adjustment parameters of the aberration correction function which are needed for the aberration correction. This has the result, that, for example with samples with complex layered arrangements of the refractive index, it may, at the end, be better to determine a piecewise linear correction function.

With regard to the spherical aberrations, it is to be noted that the influence on the image quality decreases with increasing order of the spherical aberrations. In practice, it may thus be sufficient that the aberration correction is not executed with respect to all but only with respect to the smaller orders. However, in the following, a sum of spherical aberrations is mentioned as this sum is approximately described by a sum of Zernike polynomials of small indices and already by that Zernike polynomial which describes the first order spherical aberration.

From a slightly idealized point of view, two case have now to be differentiated. In the first case, the correction device, of all the aberrations which can be described by circular Zernike polynomials of even index, only corrects the spherical aberrations but not the defocus. An additional correction of other aberrations than spherical aberrations or defocus is also possible in this first case. Decisive for the characterization of this case is that exactly a defocus is not corrected by the correction device. In this first case, a successful correction has the result that a non-aberrated focus is formed whose location is shifted with respect to the position which it would have without the presence of a mismatch of refractive indices or of a boundary layer. The magnitude of the shift depends on the axial position of the focus. In this first case, with applying the correction, one obtains data sets which are distorted depending on the value of the aberration correction slope. As, on the other hand, the value of the aberration correction slope is obtained as an adjustment value, this distortion can be corrected. The advantage of this method is that the necessary total influence of the correction device on the wavefront is smaller than in case that the defocus is also corrected. If, for example a deformable mirror which has a limited range is used as the correction device in this first case, an aberration correction may also be carried out for a thick sample and/or for strong mismatches of the refractive indices despite the limited range. Further, this method has the advantage that the aberration offset value has a direct influence on the image quality at a fixed axial position both with respect to the sample and with respect to the image.

In the second case, the correction device corrects the entire aberrations which can be described by circular Zernike polynomials of even index, i.e., also the defocus. An additional correction of other aberrations than spherical aberrations or defocus is also possible in this second case. In the second case, a successful aberration correction has the result that a non-aberrated focus is formed whose location is not shifted with respect to the position which it would have without the presence of the mismatch of the refractive indices or a boundary layer. As the focus is shifted both without correction and with insufficient correction, the application of this method results in that, during its execution, particularly between the first step of recording the first sectional image and the last step of recording a further sectional image recording prior to defining the final adjustment values for the adjustment parameters, structures included in the sample appear as shifted with respect to one another. This method has the advantage that undistorted images are obtained from the outset. It has the disadvantage that, in total, the necessary influence of the correction device on the wavefront is higher than in the first case in which the focus is not corrected. If, for example a deformable mirror having a limited range is used as the correction device, the limited range may not allow for an aberration correction for a thick sample and/or for mismatches of the refractive indices according to this method. A further disadvantage may occur, if the device which is used as the correction device shall not only be used for correcting aberrations but also for changing the focal position, i.e., for scanning the sample in axial direction, as the range of the deformable mirror may then already be needed for changing the focal position.

With respect of both cases the following is to be noted: If a change of the focal position occurs by means of a shift of the objective lens with respect to the sample, as it will be the case in many applications, this shift does not only result in a change of the position of the focus point with respect to a boundary layer or a reference layer but also in a change of the thickness of the layer of the immersion medium which is passed. However, this has no influence on the general applicability of the method. The aberration correction offset value belongs to a fixed position of the objective, and the value of the aberration correction slope necessary for the correction still linearly depends on the axial position of the focus in the sample. This slope value results from the superposition of two linear relations, because the influence of the immersion medium also linearly varies with the thickness and thus linearly with the focus position. Correspondingly, the determination of a three-parameter aberration correction function, as it may be possible in case of the formation of a refractive index gradient in the sample, or the determination of a four-parameter aberration correction function or of any such aberration correction function with more than four adjustment parameters is also possible.

In practice, the unambiguous separation of the correction of spherical aberrations from the defocus correction requires some effort, but it is possible, like, for example, described by Travis J. Gould et al., "Adaptive optics enables 3D STED microscopy in aberrating specimens", OPTICS EXPRESS, Vol. 20, No. 19, 20998-21009 (2012).

However, in the context of the present disclosure, the experimentally obtained insight that a good correction of spherical aberrations and a good image quality is possible, even if it has to be accepted that an aberration correction results in a shift of the focus because no calibration has been carried out, may even be more important. This good correction is connected with distortions of the imaging, which, however do not reduce the image sharpness and the image brightness.

As mentioned several times, other aberrations than spherical aberrations or a defocus can also be corrected with the method according to the present disclosure. If such aberrations are not caused by local structures, but, for example, by a deformation of the cover slip or something similar, these aberrations will have an effect within the entire sample, which will also depend on the axial position and possibly additionally on the lateral position within the sample. Such aberrations may be recognized and identified by means of deformations of structures of known shapes in the images. In the first instance, this applies to a deformation in images for image planes orthogonal to the optical axis. However, astigmatism, for example, also results in a distortion along the optical axis of the objective lens, i.e., in a distortion in sectional images for planes which are parallel to the optical axis. Thus, by means of the method according to the present disclosure, it is generally possible to supplement the aberration correction function by terms which are related to a correction of further aberrations, and to determine adjustment values for associated adjustment parameters.

Such an extension is particularly also suited for a correction of aberrations which are caused by local structures. Corresponding statements are already found also elsewhere.

For the application of the method according to the present disclosure using a visual inspection, adjustment elements may be presented to the user, for example on a screen as sliding controllers, which are adjustable, for example by means of a computer mouse. In order to only correct spherical aberrations and, if applicable, also a defocus, just two adjustment elements are needed. If spherical aberrations and, if applicable, also a defocus which are caused by a gradient of the refractive index shall be corrected, a third adjustment element is needed.

Preferably, each time, sectional images not only from one step of the iteration but sectional images from consecutive iteration steps are presented to the user or observer so that the user or observer, by means of comparison, may determine whether a definition of new adjustment values for the adjustment parameters and their application have resulted in an improvement of the aberration correction with regard to those adjustment values applied in a previous step or not. Further, she or he may easily recognize whether, for example, an improvement has occurred in one axial partial area, but not in another one. If, for example, a good correction is achieved in a middle axial area but not above and below, the user may, for example, define a new adjustment value particularly for the aberration correction slope. By comparing images recorded with different adjustment values for the aberration correction slope but identical adjustment values for the aberration correction offset, the user may deduce where the reference plane is at a time.

The method may also be executed automatically. In so far as sectional images of sectional planes are used, any quality criterion can be used for evaluating the image quality which is also suited for evaluating the quality of sectional images for planes which are orthogonal to the optical axis. From the prior art it is, for example, known to use the image brightness or the image contrast. Iterative methods for applying such quality criteria which allow for finding a good adjustment even if the criterion as such does not allow to decide in which sense, i.e., whether to a higher or to a lower value, an adjustment values for a correction parameter has to be altered, are also known from the prior art.

The method may advantageously be applied in confocal fluorescence microscopy using a confocal fluorescence microscope. Methods with single photon excitation belong to the confocal fluorescence microscopy. With single photon excitation, the fluorescence emission has a slightly longer wavelength than the excitation wavelength. For this kind of fluorescence microscopy, achromatic objective lenses, i.e., objective lenses that are well corrected for longitudinal and transverse color defects in the range of typical excitation and emission wavelengths are offered and typically used. In case of the confocal fluorescence microscopy with incident light, a good correction which corrects the aberrations of the excitation light beam well thus also provides a good correction of the aberrations of the detection or emission light. Methods of adjusting a detection beam path for a confocal detection relative to an excitation light beam focused in the sample are known. Generally, these methods may also be applied with aberrations present in both beam paths. The application of such a beam path adjustment is presupposed here.

In carrying out the method according to the present disclosure using such a confocal fluorescence microscope the following applies: if the illumination is poorly corrected, the area in the focal plane in which the fluorescence is excited is large, whereas the excitation intensity is comparatively low. Thus, a poor correction in the excitation light beam results in low contrast and defocused images. This at least applies as long as the focus positions for excitation and detection coincide exactly or in a good approximation. This condition is fulfilled, if an achromatic objective is used and if, at the same time, the adjustment values for the adjustment parameters of the aberration correction function are also applied to a correction device in the detection beam path. In particularly simple way, the application of the same adjustment values for the correction parameters in both beam paths is achieved in that one and the same correction device is used in both beam paths, i.e., in that the correction device is positioned in a common excitation and detection beam path. In case that the correction of the color defects, particularly the longitudinal color defects, between excitation wavelength and detection wavelength is insufficient, this longitudinal color defect may be determined upfront. At least for samples whose refractive index does not or only slightly depend on the wavelength, it is then possible to calculate how excitation beam path and detection beam path have to be corrected relative to one another with respect to the axial position of the focus point in the sample to ensure that excitation and detection focus coincide. Depending on the definition of the adjustment values for the adjustment parameters of the aberration correction function for the excitation path a corresponding adjustment of a correction device in the detection path can be selected. In case that a common correction device is positioned in a common excitation and detection path, a further correction device may additionally be arranged in one of the paths, preferably only in the detection path. The further correction device may be adjusted such that a remaining color defect is corrected. However, in confocal fluorescence microscopy, it will normally be sufficient to use the same adjustment values or the same correction device in both the excitation and the detection path. Presumably, different intensity distributions over the respective beam cross-sections will result in differences between the quality of the excitation correction and the detection correction. However, the experimental results available up to now indicate that these differences are not essential.

Further, the method may advantageously be applied in STED-microscopy (STED=stimulated emission depletion) and in further super resolution microscopy methods, i.e., in nanoscopy methods in which a kind of a switch-off light or fluorescence inhibition light is applied which ensures that the fluorescence can only be emitted out of a spatial area around a focus point that is smaller than an ordinary diffraction limited excitation spot. In the following, without limitation to generality, it is continuously referred to the STED-microscopy in which the switch-off or fluorescence inhibition light is so called depletion light. In the application of the STED-microscopy the wavelength of the depletion light is in many cases only slightly longer than that one of the fluorescence emission. Usually, objective lenses are used which are well corrected for color defects for the entire range of excitation to depletion wavelengths. As a result, the adjustment values for the adjustment parameters for the aberration correction function may, in a good approximation, also be used for an aberration correction in the depletion beam path. Thus, it is possible to execute the method according to the present disclosure in that, already during the, if applicable iterative, process for defining the adjustment values for the adjustment parameters, excitation and depletion light are used together. Such a use of the same adjustment values for the adjustment parameters in the excitation and depletion light path is in the simplest case realized in that one correction device is positioned in a common light path. All at all, it is most advantageous to position the correction device in a path common to excitation light, depletion light and detection. Both with regard to the correctable aberrations, i.e., for example, with or without correction of the defocus, with regard to the model of the spherical aberrations, the execution by means of visual inspection or as an automatized method, and with regard to further aspects like, for example, the possibility to compensate for color defects between excitation and detection wavelength, the statements further above also apply to the method with common use of excitation and depletion light. Thus, it is also possible to execute the method according to the present disclosure at first by means of confocal microscopy and to afterwards apply the obtained adjustment values for the adjustment parameters also to the depletion beam. The latter is preferred, at least if the adjustment values for the adjustment parameters are defined based on sectional images of the region of interest of the sample which the user wants to investigate microscopically, because the sample is then only subjected to the excitation light and not additionally to the depletion light and thus bleached to a lesser extent.

In STED-microscopy, it has further to be considered that the image quality, for example measured as brightness, contrast and image sharpness, stronger depends on the quality of the depletion focus than on the quality of the excitation focus. Further it is to be considered that the spatial resolution of the STED-microscopy is clearly higher than that one of the confocal fluorescence microscopy. This means that an aberration correction which is sufficient to ensure a high image quality in confocal fluorescence microscopy does not need to be sufficient to achieve a high quality of the STED images. This, for example means that a color defect which has no relevant effect in confocal microscopy may have a strong negative effect in STED-microscopy. Thus, it is suitable to apply the method according to the present disclosure using excitation and depletion light in order to define adjustment values for the adjustment parameters of an aberration correction function for a correction device which has an effect on the depletion light beam but not on the detection light beam. This is also possible and easily realized in many cases. In the prior art, microscopes are known in which the wavefront shaping necessary for forming the STED-focus, for example into a donut, is executed by means of an adjustable wavefront modulator. Further, a method is known in the prior art, see international application publication WO 2014 029978 A1, in which such a correction is executed by means of sectional images which are orthogonal to the optical axis.

The method of defining adjustment values for adjustment parameters of an aberration correction function for the depletion light only comprises the steps of—i) recording a first sectional image parallel to the optical axis of the microscope objective lens by scanning a sample with a focused excitation light distribution and a depletion light distribution focused such that it has a local intensity minimum in the center of the focused excitation light distribution in a sectional area parallel to the optical axis of the microscope objective lens, wherein the excitation light distribution is corrected by means of an adjustable correction device according to final adjustment values for adjustment parameters of an aberration correction function, and wherein the depletion light distribution is corrected by means of an adjustable correction device according to initial adjustment values for the adjustment parameters of the additional aberration correction function for the depletion light, wherein for each scanning position fluorescence light emitted out of the sample is detected, or of a plurality of such first sectional images, —ii) evaluating the first sectional image or the plurality of such first sectional images, —iii) defining new adjustment values for the adjustment parameters of the additional aberration correction function for the depletion light.

If final adjustment values for the adjustment parameters of the additional aberration correction function for the depletion light can already be defined in this step, the sample or of another corresponding sample may afterwards be investigated by means of STED-microscopy. Failing this, the above-mentioned steps are repeated, wherein the new adjustment values for the adjustment parameters each time replace the initial adjustment values for the adjustment parameters of the additional aberration correction function for the depletion light until final adjustment values for the adjustment parameters are defined.

In case of single photon excitation, a confocal detection, for example using a confocal pinhole, is applied in STED-microscopy, as a rule. Thus, the adjustment values for the adjustment parameters of the aberration correction function for the excitation light and correspondingly the adjustment values for the adjustment parameters of the aberration correction function for the detection light should be determined prior to determining the adjustment values for the adjustment parameters for the additional aberration correction function for the depletion light. If these adjustment values for the adjustment parameters are applied, it is ensured, that the excitation focus and the detection focus coincide in all axial locations. Now, in the determination of the adjustment values for the adjustment parameters of the additional aberration correction function for the depletion light, both a defocus relative to the excitation and particularly to the detection focus and spherical aberrations have to be corrected for to obtain the full benefit. The corresponding aberration correction functions may correspond to those described further above; the associated adjustment values for the adjustment parameters may be defined correspondingly.

However, a case may occur in which the defocus and the spherical aberrations do not need to be corrected to a same extent, as the depletion focus has to be shifted onto the detection focus which, even after aberration correction is not necessarily there, where a depletion focus on which no aberrations have been imprinted would be. Under these conditions, the adjustment values for the adjustment parameters of the additional aberration correction function may be defined in that at first only adjustment values for the adjustment parameters for a correction of the defocus and not of the spherical aberrations are defined, and only afterwards other adjustment values for the adjustment parameters for a correction of the spherical aberrations are defined. This means that the number of the adjustment parameters for correcting the aberrations represented by circular Zernike polynomials of even index have to be doubled, or, at least, that a good correction can be achieved with doubling the number of these adjustment parameters. The reason is that, if the depletion focus is aberrated, it can be recognized from the sectional images when the defocus is corrected, and, if the defocus is corrected, it can be recognized from the sectional images whether the focus is aberrated or corrected. Thus, in some way, a poor depletion focus is at first shifted for all axial positions to the right location, and afterwards the focus positioned at the right location is improved. This is possible independently on whether the correction devices or the common correction device for the excitation light and the detection light correct(s) the respective defocus or not. Even in case that a strict separation between defocus correction and correction of spherical aberrations is not possible, because the necessary calibration or modeling has not been executed, a good correction may at least be achieved iteratively, as in the normal case the focus is only slightly shifted and slightly aberrated, if the previously defined adjustment values for the adjustment parameters of the aberration correction function for the excitation light are applied to the depletion beam.

Furthermore, the method can advantageously be applied in multiphoton fluorescence microscopy. If thick samples are investigated by multiphoton fluorescence microscopy, the detection is not confocal as a rule. The image quality then only or highly predominantly depends on the quality of the excitation focus. In so far, the method according to the present disclosure may be essentially implemented in the same way as in confocal fluorescence microscopy, the necessity to provide an aberration correction for the detection path being omitted. In so far, color defects between excitation wavelength and detection wavelength are normally not critical. However, in particular cases, even in multiphoton fluorescence microscopy the detection occurs confocally or with a spatially resolving detector located in a confocal plane, respectively. In such cases the adjustment values for the adjustment parameters of the aberration correction function for the excitation light may for example be determined with removed or completely opened confocal pinhole, and adjustment values for adjustment parameters of a further aberration correction function for the detection beam path may be defined afterwards.

Generally, the present disclosure may also be applied in microscopy in which a multiphoton excitation is combined with the application of depletion light.

The present disclosure may further be applied to improve MINFLUX microscopy. Here, the method for defining the adjustment values for the adjustment parameters is to be executed using the MINFLUX excitation wavelength in ordinary confocal imaging. The adjustment values for the adjustment parameters of the aberration correction function obtained therefrom are then to be used in the execution of the MINFLUX method.

A further improvement of fluorescence-microscopically imaging three-dimensional images is achieved in that one after the other a plurality of vertically oriented sectional images of a sample, i.e., of sectional images which are parallel to the optical axis of the microscope objective lens and parallel with respect to one another, are recorded, wherein the image planes are arranged at distances from one another in a direction orthogonal to the optical axis. Then, a volume data set results from the stack of vertically oriented sectional images. As compared to obtaining a volume data set as a stack of horizontally oriented sectional images, this way of obtaining image data has the advantage that the image data, in direction of the optical axis, show smaller gradients of the locally averaged image brightness. The reason is that, in obtaining the image data in this vertical way, the planes which are oriented orthogonally to the optical axis, i.e., oriented horizontally, are more uniformly bleached with respect to one another up to the point in time at which image data are obtained for a partial sample volume of such a plane. If horizontally oriented images are recorded and combined in an image stack, the partial volumes of the first plane for which the image data are recorded, which is, without limitation of generality, here referred to as the uppermost plane, are not bleached at all or bleached only very little at the point in time at which the image data are obtained, whereas the partial volumes of the following planes are bleached in recording all previous planes. Because the excitation beam is of larger extensions in front of and behind the focus point than in the focus point, an excitation light beam does not only bleach fluorophores on the axis of the excitation beam but also in an area which extends along the axis in a shape of a double-cone. Up to the point in time at which the image data for a volume within the image plane which is here called the lowermost image plane are obtained, this volume has thus been bleached by light beams which have been used for obtaining data for image points located above on or around the optical axis. To the contrary, in recording vertically oriented image planes by scanning along horizontal lines each time followed by an axial feed, the same volume is, up to the point in time of obtaining data, only bleached by light beams which have been used for obtaining data for volumes which are above or neighboring along the direction of the vertically oriented image planes or which belong to such planes in direction orthogonal to the vertically oriented image planes, for which image data have been recorded at a previous point in time. The light beams, which belong to later recorded vertically oriented planes do not contribute to the bleaching up to the point in time of obtaining data. The opposite applies for obtaining data in the upper planes, i.e., partial volumes located within an upper plane are bleached stronger prior to the point in time of obtaining data than in obtaining volume data sets from a stack of horizontally oriented images. All at all, a lower gradient of the locally averaged image brightness in direction of the optical axis, i.e., a better homogeneity of the image brightness, is achieved.

An even better homogeneity is achieved if the sequence of the scanning steps in obtaining the vertically oriented images is inverted in that sense that each time at first the image data for volumes along the optical axis are recorded, i.e., it is scanned in vertical lines along the optical axis, each time followed by a horizontal feed. This further reduces the amount of light which gets to a lower position partial volume before image data are obtained for this partial volume.

This way of recording images develops its full advantage in combination with an apparatus according to the present disclosure which is described further below. A particularly high quality of the three-dimensional image data sets or volume images is achieved, if this way of recording images is applied after the adjustment values for the correction device have been determined with the method according to the present disclosure. In fact, this way of recording images may also be advantageously used independently on the method by which the adjustment values for a correction device are determined or have been determined or even independently on the presence of any correction device. Thus, this method by which the homogeneity of the image brightness in axial direction is improved is applicable independently on the invention claimed here; it also is an invention of its own.

At some points, particularly there, where reference is made to directions of detection path and illumination path, the above description is based on the assumption that excitation and detection use the same objective lens, i.e., that an incident illumination is used. This shall not be construed to limit the present disclosure. Instead, the present disclosure is also applicable, if a transmitted light arrangement or, for example, a 4-Pi-microscope is used, e.g., one in which two facing objectives are used for illumination and detection. In the latter case it is useful to separately determine adjustment values for the adjustment parameters for the path of each individual objective lens and to only afterwards use both paths simultaneously. It is clear to one skilled in the art how she or he may transfer statements which are directly or implicitly related to microscopy with incident light to other microscopy arrangements or methods.

The scanning fluorescence microscope according to the present disclosure is configured for executing the method according to the present disclosure. It comprises an excitation light source for excitation light, a microscope objective lens for focusing an excitation light distribution of the excitation light, a mounting device for mounting a sample, a device for moving an excitation light beam relative to a mounted sample in three spatial dimensions, an adjustable correction device for aberration correction of the excitation light, a detection device for detecting fluorescence light, and a storage device for storing image data sets. Further, the scanning fluorescence microscope comprises a controller for adjusting the correction device, and either an evaluation unit for evaluating image data sets and for defining new and final adjustment values for adjustment parameters of an aberration correction function according to which the adjustable correction device is adjusted for aberration correction of the excitation light, or a display unit for displaying image data in combination with an input unit for receiving user inputs with respect to defining new and final adjustment values for the adjustment parameters. The scanning device is configured for executing the first step and the fourth step of the method according to the present disclosure, and either the evaluation unit is configured for executing the second step and the third step of the method according to the present disclosure, or the display unit is configured for displaying the first sectional image, which has been recorded in the first step of the method according to the present disclosure and which is parallel to the optical axis of the microscope objective lens. In the latter case, the second step and the third step of the method according to the present disclosure are executed by a human observer on basis of the displayed sectional image, wherein she or he makes user inputs into the input unit which correspond to the adjustment values for the adjustment parameters which have been newly defined by her or him.

In a preferred embodiment, the correction device is a deformable mirror which is arranged in a common path of excitation and detection light.

Further, it is preferred that the scanning fluorescence microscope according to the present disclosure additionally comprises a depletion light source and devices for shaping the depletion focus. In this case, the deformable mirror is preferably arranged in a common path of excitation, detection and depletion light.

The use of a deformable mirror as the correction device has the advantage that its optical properties do not depend on the wavelength or the polarization state. A deformable mirror may, besides as a correction device, simultaneously also be used for moving the focus. Thus, it allows for quickly scanning in axial direction. This is also and particularly advantageous with regard to the image recording method that is directed to an improvement of the homogeneity of the image brightness.

Referring now in greater detail to the drawings, FIG. 1 is a first sectional image of a sample. The first sectional image has been imaged as a plane section parallel to the optical axis of an objective lens of a confocal laser scanning fluorescence microscope. Thus, the first sectional image was recorded by scanning a sectional plane parallel to the optical axis of the objective lens. In axial direction, the sectional plane has been scanned by moving the objective lens. The first sectional image shows an area of the sample which extends over about 140 μm in axial direction. The upper image boundary approximately corresponds to the position of a cover slip. The laser scanning fluorescence microscope used comprises a deformable mirror in a common section of an excitation path and a detection path. During the axial scanning, this deformable mirror was adjusted according to initial adjustment values which may be zero. It can be seen that particularly the structures close to the lower image boundary are blurred. However, the structures closer to the upper image boundary are also blurred.

Figure 2:
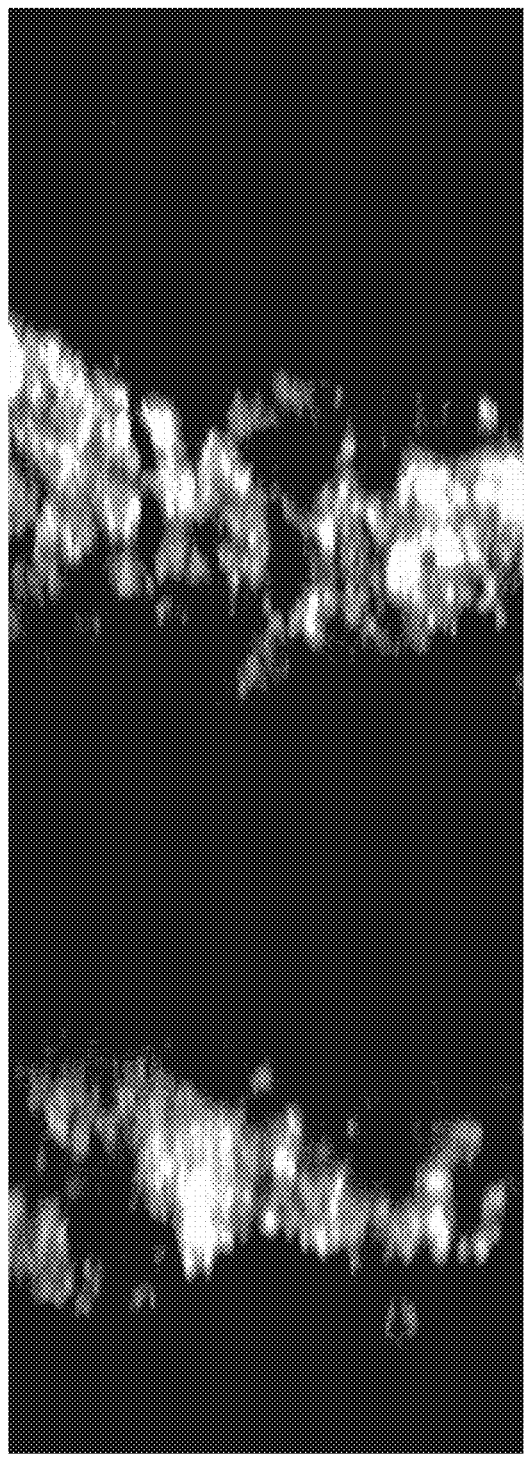
FIG. 2 is a sectional image corresponding to FIG. 1, but obtained using new, non-final adjustment values for adjustment parameters of an aberration correction function.

FIG. 2 is a further sectional image of the same sample which has basically been recorded in the same way as the first sectional image of FIG. 1. However, during the axial scanning, aberrations of the wavefront have been corrected by means of adjusting the deformable mirror according to new adjustment values for adjustment parameters of an aberration correction function which have been defined on basis of a visual inspection of the first sectional image. It can be seen that both the structures close to the upper image boundary and the structures close to the lower image boundary are imaged more sharply. Further, in a comparison of FIG. 2 to FIG. 1, it can be seen that particularly the structures close to the lower image boundary in the second image appear to be closer to the upper image boundary than in the first image. This will be discussed further below.

Figure 3:
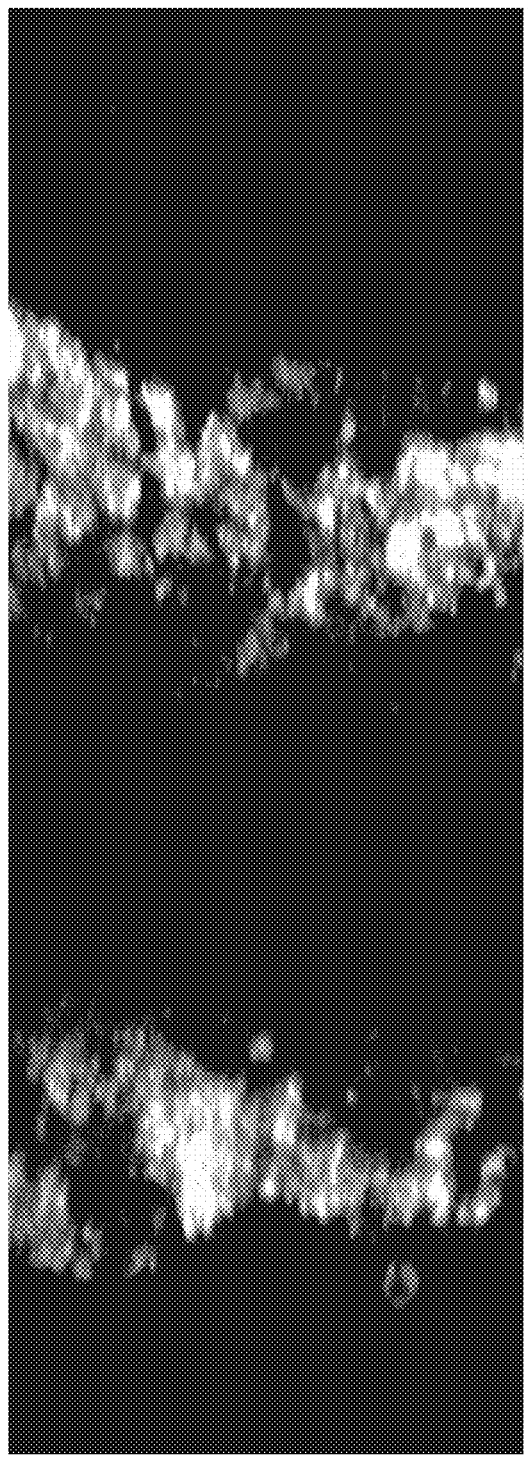
FIG. 3 is a sectional image corresponding to FIGS. 1 and 2, but obtained using final adjustment values for the adjustment parameters of the aberration correction function.

FIG. 3 is a further sectional image of the same sample which has basically been recorded in the same way as the first and second sectional images of FIGS. 1 and 2. However, during the axial scanning, aberrations of the wavefront have been corrected by means of adjusting the deformable mirror according to new adjustment values for the adjustment parameters of the aberration correction function which have been defined on basis of a visual inspection of the second sectional image. After the recording of the third sectional image, these adjustment values have been defined as final adjustment values. It can be seen that both the structures close to the upper and also close to the lower image boundary are imaged even more sharply and that the image sharpness in both areas is similarly good. As compared to the second image, now both the structures at the upper image boundary and at the lower image boundary appear closer shifted towards the upper image boundary. This will be discussed further below.

The depicted image data are actual experimental data. Thus, in a process using a visual inspection with two evaluation and definition steps, a correction has in fact been achieved which has resulted in a very significant improvement of the image quality. In the third step, this improvement has just been confirmed. Further correction processes carried out by the applicant proved that a very good aberration correction can be achieved with few steps.

Figure 4:
FIG. 4 is a depiction of a volume data set of a sample.

FIG. 4 shows a volume data set of another sample. The image area covers an area of the sample which extends about 50 μm in axial direction. In scanning the sample an aberration correction was applied. It can be seen that the image sharpness in the entire area along the optical axis is approximately constant.

The shift visible in FIGS. 1 to 3 has its cause in the practical implementation of the method. Further above, it has been explained that certain aberrations can be represented by circular Zernike polynomials of even index. The Zernike polynomials form a set of orthogonal functions on the unit circle. This means that the correction of a plane wavefront with uniform intensity over its cross-section can be independently carried out with respect to its different aberrations which can each be described by a certain Zernike polynomial. In other words: a defocus can be corrected without correcting another spherical aberration, and vice versa. In fact, this condition is only strictly fulfilled, if the intensity of a wavefront is constant over its cross-section. It may be the case that with regard to wave optics the constancy of the average field strength may be decisive but if this is constant, then the intensity is also constant. For the further considerations this is irrelevant.

The correction of a wavefront can be achieved in a simple way in that a deformable mirror is used. Alternatively, a wavefront modulator known as SLM and based on liquid crystal technology may be used. A combination of a mirror or a SLM and a zoom lens or a movable lens may also be considered, wherein lens-optical elements are particularly suited to shift a focus. Here, a deformable mirror has been used in a common beam path for excitation and detection onto which the wavefronts impinge at a small angle, i.e., nearly orthogonally, and which reflects these wavefronts. The mirror was then deformed in a way that its form corresponded to a sum of circular Zernike polynomials of even index, wherein no defocus term has been used. As the mirror is also located in the detection beam path, the correction for the excitation beam path was directly also applied to the detection beam path. In an ideal case, i.e., under the condition that the intensity of a wavefront is constant over its cross-section, the wavefront modification caused by the mirror would only have the effect that the foci would be improved without changing their position. To achieve this, the further conditions must be met that the deformable mirror is located in a plane conjugated to a back aperture, and that the image of the area deformed according to Zernike polynomials exactly fills the back aperture. The latter condition has been met in a very good approximation in that the axis of the deformable mirror has been positioned in such a plane conjugated to the back aperture and in that a small angle under which the wavefront impinges on the mirror has been selected and in that exactly that area of the mirror has been used and deformed that is imaged into the back aperture. This applies in a good approximation even with shifting the objective and thus the back aperture for axially scanning the sample, as this shift is very small as compared to the focal length.

Now, the reason for the shift is that the excitation beam used just has no constant intensity over its cross-section but rather an intensity distribution corresponding to a Gaussian profile. Thus, the orthogonality of the Zernike polynomials with respect to each other is broken up. As a result, as visible in FIGS. 1 to 3, imprinting a wavefront modulation which in the ideal case does not correct the defocus but only spherical aberration also shifts the focus. However, it can also be seen from the figures that a good correction is nevertheless possible. The figures thus also confirm that the possible effects of different intensity distributions of the excitation light and the detection light in the back aperture and the planes conjugated thereto are sufficiently small so that an application of the aberration correction for the excitation light onto the detection light results in a good aberration correction. It has only to be considered that the image, depending on the correction, is expanded or compressed in axial direction. In the depicted example, it is compressed due to the aberration correction. If samples are homogeneous, this bothers little and may easily be corrected. If the samples are inhomogeneous samples of that kind that different corrections of the aberrations representable by circular Zernike polynomials of even index are necessary at different lateral positions, this results in that points which are located within the same plane orthogonal to the optical axis may appear at an axial offset in the volume image. In many cases this effect is neglectable small. When the effect is large, this is known from the adjustment values of the correction parameters determined so that the effect can be considered.

Figure 5:
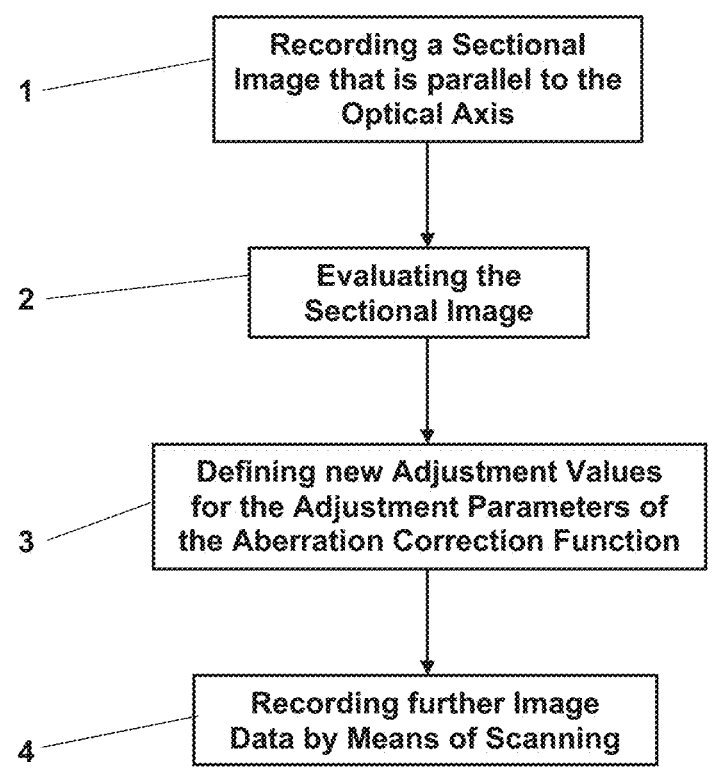
FIG. 5 is a flowchart of a first embodiment of the method of microscopically recording images of samples of three-dimensional extension.

FIG. 5 is a flowchart of a first embodiment of the method according to the present disclosure. In a first step 1, a first sectional image which is parallel to the optical axis is recorded by scanning a sample with a focused excitation light distribution, wherein the excitation light distribution is corrected according to initial adjustment values for adjustment parameters of an aberration correction function. In this way, for example, the first sectional image of FIG. 1 is obtained. In a consecutive step 2, this first sectional image is evaluated. In a step 3, new adjustment values for the adjustment parameters of the aberration correction function are defined in order to remove the aberrations determined on basis of the first sectional image as completely as possible. With these new adjustment values for the adjustment parameters further image data are then recorded by scanning the sample in a step 4. In the step 4, for example, the sectional image of FIG. 3 may be recorded.

Figure 6:
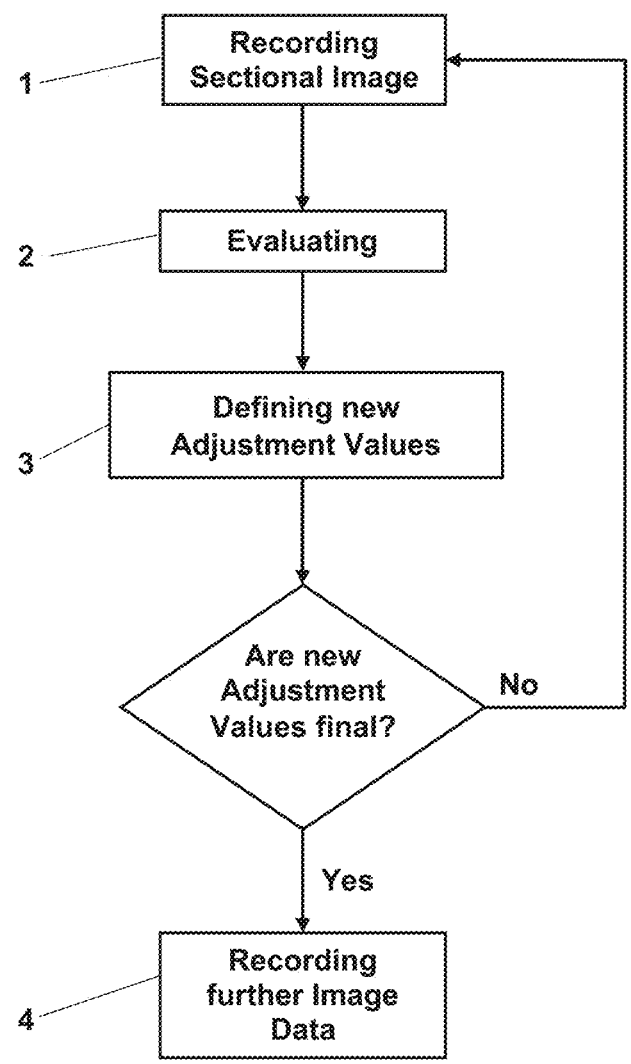
FIG. 6 is a flowchart of an iterative second embodiment of the method of microscopically recording images of samples of three-dimensional extension.

FIG. 6 is a flowchart of a first iterative embodiment of the method according to the present disclosure. Here, an examination whether the new adjustment values for the adjustment parameters are final follows to the definition of the new adjustment values in step 3. If this is the case, the recording of further image data occurs in step 4. If the new adjustment values for the adjustment parameters are not yet final, because, for example, their changes with respect to the previous adjustment values have still been very big, the steps 1 to 3 are repeated.

Figure 7:
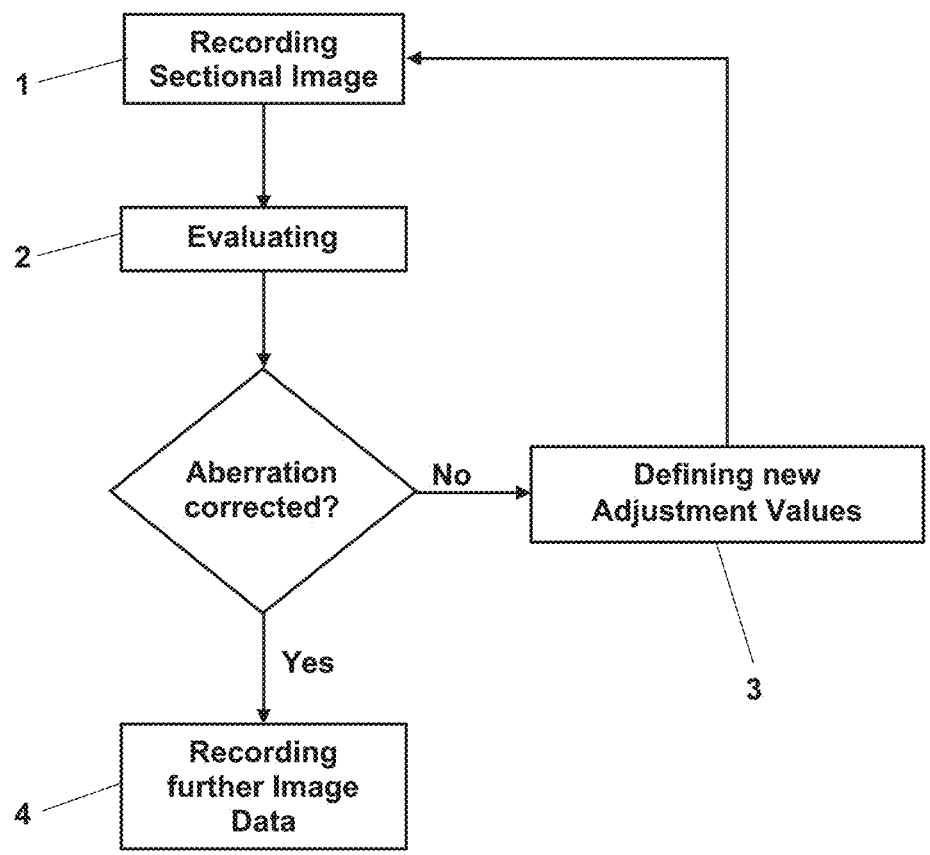
FIG. 7 is a flowchart of an also iterative third embodiment of the method of microscopically recording images of samples of three-dimensional extension.

FIG. 7 also is a flowchart of an iterative embodiment of the method according to the present disclosure. Here, after the evaluation in step 2, an examination takes place whether already with the original adjustment values for the adjustment parameters of the aberration correction function all aberrations are sufficiently corrected. Only if this is not the case, new adjustment values for the adjustment parameters are defined in the step 3, and then the steps 1 and 2 are repeated with the new adjustment values. The step 4 of recording further image data which are the actual image data of interest with the completely aberration corrected excitation light distribution only occurs, if it has been determined in the evaluation in step 2 that the aberrations are sufficiently corrected. Even in the iterative embodiment of the method according to the present disclosure, the first step 1, the second step 2, the third step 3 and the fourth step 4 follow to one another in this order as soon as only once new adjustment values for the adjustment parameters have been defined in the step 3. However, repetitions of the first step 1 and the second step 2 may follow thereto before the fourth step 4 is executed.

Figure 8:
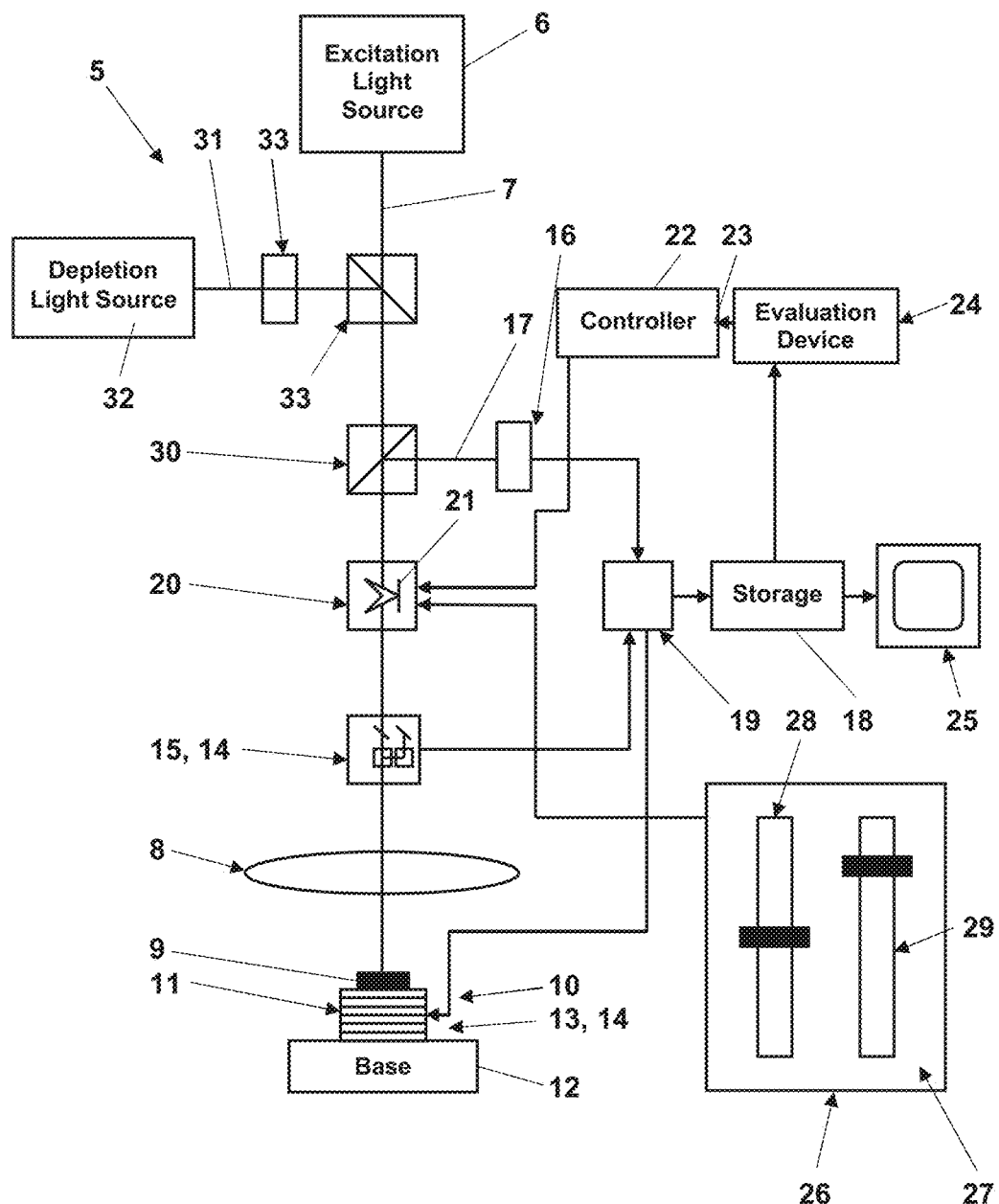
FIG. 8 is a block diagram of an embodiment of the scanning fluorescence microscope.

FIG. 8 is a block diagram of an embodiment of the scanning fluorescence microscope 5 according to the present disclosure. An excitation light source 6 provides excitation light 7. A microscope objective lens 8 focuses an excitation light distribution of the excitation light 7 into a sample 9. The sample 9 is mounted to a mounting device 10. A sample holder 11 of the mounting device 10 is movable with respect to a base 12 by means of an actuator 13 which indicated here as a piezo stack in z-direction of an optical axis of the microscope objective lens 8. Alternatively or additionally, the microscope objective lens 8 may also be adjustable or movable in z-direction. Scanning devices 14 for scanning the sample with the focused excitation light distribution in all three spatial dimensions further include an x/y-scanner 15. A detection device 16 serves for detecting fluorescence light 17 emitted out of the sample for each scanning position of the focused excitation light distribution in the sample 9. A storage device 18 serves for storing image data sets which are combined by a combiner 19 from the positions of the scanner 15 and the actuator 13 and the associated output signals of the detection device 16. An adjustable correction device 20 is provided for correcting aberrations of the excitation light distribution in the sample 9. For this purpose, values of parameters of an aberration correction function which is implemented by means of the correction device can be adjusted. The aberration correction function is a function of the z-position of the focused excitation light distribution in the sample 9, i.e., of the position of the focused excitation light distribution along the optical axis of the microscope objective lens 8. The correction device 20 includes a deformable mirror 21. A controller 22 is provided for adjusting the correction device 20. The controller 22 receives the adjustment values 23 for the adjustment parameters of the aberration correction function from an evaluation device 24. The evaluation device 24 evaluates image data sets of the sectional images, which are recorded according to the method according to the present disclosure and which extend parallel to the optical axis of the microscope objective lens 8, in order to automatically define the adjustment values 23 for the adjustment parameters. Alternatively, the adjustment values 23 for the adjustment parameters may be defined manually on basis of the sectional images displayed on a display unit 25, i.e., via a further controller 26 which is provided alternatively or additionally and which comprises an input unit 27 with, here, two sliding controllers 28 and 29 for setting adjustment values for two adjustment parameters of the aberration correction function. The correction device 20 is provided in a common path of the excitation light 7 and the fluorescence light 17, i.e., between the sample 9 and a beam splitter 30 which couples-out or diverts the fluorescence light 17 towards the detection device 16. Here, the correction device 20 is also located in the path of additional depletion light 31, for example STED-light, which is provided by a depletion light source 32 and which is merged with the excitation light 7 by means of a further beam splitter 33. A further correction device 34 is arranged in the path of the depletion light 31 only, and may, besides an aberration correction particular of the depletion light 31, also be provided for purposefully deform wavefronts of the depletion light 31 such that the depletion light 31, for example, comprises an intensity minimum at the location of a central intensity maximum of the excitation light distribution.

Many variations and modifications may be made to the preferred embodiments of the invention without departing substantially from the spirit and principles of the invention. All such modifications and variations are intended to be included herein within the scope of the present invention, as defined by the following claims.

We claim:

1. A scanning fluorescence microscope comprising
an excitation light source configured for providing excitation light having an excitation light distribution,
a microscope objective lens having an optical axis and configured and arranged for focusing the excitation light distribution of the excitation light,
a mounting device configured for mounting a sample,
a scanning device configured and arranged for scanning the sample mounted on the mounting device with the focused excitation light distribution in three spatial dimensions,
a detection device configured and arranged for detecting fluorescence light emitted out of the sample for each scanning position of the scanning device,
a storage device configured for storing sets of image data,
an adjustable correction device configured for correcting aberrations of the excitation light distribution,
a controller configured and connected for adjusting the correction device, and
an evaluation unit configured and connected for evaluating the sets of image data and for defining adjustment values for adjustment parameters of an aberration correction function according to which the adjustable correction device is adjusted by the controller, wherein the aberration correction function is a function of a z-position of the scanning position in a z-direction along the optical axis of the microscope objective lens,
wherein the scanning device is configured for scanning a first sample with the focused excitation light distribution in a sectional area that is parallel to the optical axis of the microscope objective lens such that at least one first sectional image is recorded along the optical axis of the microscope objective lens, wherein the excitation light distribution is corrected by means of the adjustable correction device according to initial adjustment values for the adjustment parameters of the aberration correction function and wherein fluorescence light emitted out of the first sample is detected for each scanning position by means of the detection device, wherein the evaluation unit is configured for evaluating the at least one first sectional image and for defining new adjustment values for the adjustment parameters of the aberration correction function, and wherein the scanning device is further configured for scanning the first sample or another sample with the focused excitation light distribution for recording further image data, wherein the excitation light distribution is corrected by means of the adjustable correction device according to the new adjustment values for the adjustment parameters of the aberration correction function, and wherein fluorescence light emitted out of the respective first or other sample is detected for each scanning position by means of the detection device.

2. The scanning fluorescence microscope of claim 1, wherein the correction device is arranged in a common path of the excitation light and the fluorescence light.

3. The scanning fluorescence microscope of claim 1, comprising a depletion light source configured for providing depletion light, wherein the correction device is arranged in a common path of the excitation light, the fluorescence light and the depletion light.

4. The scanning fluorescence microscope of claim 3, wherein an additional correction device configured for correcting aberrations of the depletion light is arranged in a separate path of the depletion light only.

5. The scanning fluorescence microscope of claim 1, wherein the correction device comprises a deformable mirror.

6. A scanning fluorescence microscope comprising
an excitation light source configured for providing excitation light having an excitation light distribution,
a microscope objective lens having an optical axis and configured and arranged for focusing the excitation light distribution of the excitation light,
a mounting device configured for mounting a sample,
a scanning device configured and arranged for scanning the sample mounted on the mounting device with the focused excitation light distribution in three spatial dimensions,
a detection device configured and arranged for detecting fluorescence light emitted out of the sample for each scanning position of the scanning device,
a storage device configured for storing sets of image data,
an adjustable correction device configured for correcting aberrations of the excitation light distribution,
a controller configured and connected for adjusting the correction device,
an input unit configured for receiving user input for defining adjustment values for new adjustment values for adjustment parameters of an aberration correction function according to which the adjustable correction device is adjusted by the controller, wherein the aberration correction function is a function of a z-position of the scanning position in a z-direction along the optical axis of the microscope objective lens, and
a display unit for displaying the sets of image data,
wherein the scanning device is configured for scanning a first sample with the focused excitation light distribution in a sectional area that is parallel to the optical axis of the microscope objective lens such that at least one first sectional image is recorded along the optical axis of the microscope objective lens, wherein the excitation light distribution is corrected by means of the adjustable correction device according to initial adjustment values for the adjustment parameters of the aberration correction function and wherein fluorescence light emitted out of the first sample is detected for each scanning position by means of the detection device, wherein the display unit is configured for displaying the at least one first sectional image recorded along the optical axis of the microscope objective lens, and wherein the scanning device is further configured for scanning the first sample or another sample with the focused excitation light distribution for recording further image data, wherein the excitation light distribution is corrected by means of the adjustable correction device according to the new adjustment values for the adjustment parameters of the aberration correction function, and wherein fluorescence light emitted out of the respective first or other sample is detected for each scanning position by means of the detection device.

7. The scanning fluorescence microscope of claim 6, wherein the correction device is arranged in a common path of the excitation light and the fluorescence light.

8. The scanning fluorescence microscope of claim 6, comprising a depletion light source configured for providing depletion light, wherein the correction device is arranged in a common path of the excitation light, the fluorescence light and the depletion light.

9. The scanning fluorescence microscope of claim 8, wherein an additional correction device configured for correcting aberrations of the depletion light is arranged in a separate path of the depletion light only.

10. The scanning fluorescence microscope of claim 6, wherein the correction device comprises a deformable mirror.

11. The scanning fluorescence microscope of claim 1, wherein the aberration correction function is a linear function of a z-position along the optical axis of the microscope objective lens and wherein the adjustment parameters of the aberration correction function are an aberration correction offset and an aberration correction slope.

12. The scanning fluorescence microscope of claim 1, wherein the aberration correction function is a square function of a z-position along the optical axis of the microscope objective lens.

13. The scanning fluorescence microscope of claim 1, wherein the aberration correction function is a function of a z-position along the optical axis of the microscope objective lens, that is additively composed of a linear or square function component that is directed to a correction of at least one of a defocus or spherical aberration, and a function component that is directed to a correction of further aberrations.

14. The scanning fluorescence microscope of claim 1, wherein the scanning device is configured for scanning the first sample or the other sample with the focused excitation light distribution such that a plurality of first or further sectional images are recorded, wherein the excitation light distribution is corrected by means of the adjustable correction device according to different adjustment values for the adjustment parameters of the aberration correction function.

15. The scanning fluorescence microscope of claim 1, wherein the scanning device is configured for scanning the first sample or the other sample with the focused excitation light distribution such that a plurality of first or further sectional images are recorded, wherein the excitation light distribution is corrected by means of the adjustable correction device according to the same adjustment values for the adjustment parameters of the aberration correction function and wherein the sectional areas associated with the plurality of first or further sectional images are arranged at lateral distances or oriented at angles with respect to one another.

16. The scanning fluorescence microscope of claim 1, wherein the evaluation unit is configured and connected for separately defining the adjustment values for adjustment parameters of the aberration correction function for different axial partial areas of the sample.

17. The scanning fluorescence microscope of claim 6, wherein the aberration correction function is a linear function of a z-position along the optical axis of the microscope objective lens and wherein the adjustment parameters of the aberration correction function are an aberration correction offset and an aberration correction slope.

18. The scanning fluorescence microscope of claim 6, wherein the aberration correction function is a square function of a z-position along the optical axis of the microscope objective lens.

19. The scanning fluorescence microscope of claim 6, wherein the aberration correction function is a function of a z-position along the optical axis of the microscope objective lens, that is additively composed of a linear or square function component that is directed to a correction of at least one of a defocus or spherical aberration, and a function component that is directed to a correction of further aberrations.

20. The scanning fluorescence microscope of claim 6, wherein the scanning device is configured for scanning the first sample or the other sample with the focused excitation light distribution such that a plurality of first or further sectional images are recorded, wherein the excitation light distribution is corrected by means of the adjustable correction device according to different adjustment values for the adjustment parameters of the aberration correction function.

21. The scanning fluorescence microscope of claim 6, wherein the scanning device is configured for scanning the first sample or the other sample with the focused excitation light distribution such that a plurality of first or further sectional images are recorded, wherein the excitation light distribution is corrected by means of the adjustable correction device according to the same adjustment values for the adjustment parameters of the aberration correction function and wherein the sectional areas associated with the plurality of first or further sectional images are arranged at lateral distances or oriented at angles with respect to one another.

22. The scanning fluorescence microscope of claim 6, wherein the input unit is configured for receiving different axial partial areas of the sample, into which the sample is partitioned on basis of a visual inspection of at least one of the sectional images displayed on the display unit, and wherein the input unit is configured for separately defining the adjustment values for adjustment parameters of the aberration correction function for the different axial partial areas of the sample.

23. The scanning fluorescence microscope of claim 7, wherein the scanning device is configured for scanning the first sample or the other sample with the focused excitation light distribution such that a plurality of first or further sectional images are recorded, wherein the excitation light distribution is corrected by means of the adjustable correction device according to different adjustment values for the adjustment parameters of the aberration correction function.

24. The scanning fluorescence microscope of claim 1, wherein:
  a sectional plane in which the sample is scanned with the focused excitation light distribution is parallel to the optical axis of the microscope lens such that the first sectional image is recorded parallel to the optical axis of the microscope lens.

25. The scanning fluorescence microscope of claim 24, wherein:
  the aberration correction function is a function of a z-position in the sample that varies along the optical axis of the microscope lens, and
  at least when the excitation light distribution is corrected by means of the adjustable correction device according to the new adjustment values for the adjustment parameters of the aberration correction function, the excitation light distribution is not corrected by means of the adjustable correction device for all z-positions in the sample in a same way.

\* \* \* \* \*